US012560910B2

(12) United States Patent
Acharya et al.

(10) Patent No.: US 12,560,910 B2
(45) Date of Patent: Feb. 24, 2026

(54) STREAMING DATA CONTEXTUALIZATION FOR INDUSTRIAL ASSETS

(71) Applicant: HONEYWELL INTERNATIONAL INC.

(72) Inventors: Bhabesh Chandra Acharya, Bangalore (IN); Kumaresh Baabu, Bangalore (IN); Naveen R, Mysuru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 549 days.

(21) Appl. No.: 18/174,801

(22) Filed: Feb. 27, 2023

(65) Prior Publication Data

US 2024/0288853 A1 Aug. 29, 2024

(51) Int. Cl.
G06F 16/00 (2019.01)
G05B 19/418 (2006.01)

(52) U.S. Cl.
CPC ..... G05B 19/4183 (2013.01); G05B 19/4185 (2013.01)

(58) Field of Classification Search
CPC .......................... G05B 19/4183; G05B 19/4185
USPC ........................................................ 707/706
See application file for complete search history.

(56) References Cited

U.S. PATENT DOCUMENTS

2023/0360385 A1* 11/2023 Lam ..................... G03H 1/0808
707/707

FOREIGN PATENT DOCUMENTS

WO WO2023196335 * 10/2023 ............. G06F 9/455

* cited by examiner

*Primary Examiner* — Alexandria Y Bromell
(74) *Attorney, Agent, or Firm* — ALSTON & BIRD LLP

(57) ABSTRACT

Various embodiments relate to mapping hierarchical reference data associated with industrial assets and contextualizing raw streaming data generated by the industrial assets. Embodiments are configured to receive an application programming interface (API) call request to map hierarchical reference data comprised in a digital twin system that digitally represents assets within an industrial environment. In response to the API call request, embodiments can generate flattened asset data objects associated with the hierarchical reference data, where the flattened asset data objects comprise respective mappings of data attributes for the hierarchical reference data. Embodiments can correlate raw streaming data related to the assets with the flattened asset data objects to generate contextualized asset data for the one or more assets. Embodiments can also update, based on the contextualized asset data, the digital twin system to facilitate asset data queries for the one or more assets via the digital twin system.

18 Claims, 21 Drawing Sheets

300
RAW STREAMING
DATA 308
REQUEST 310
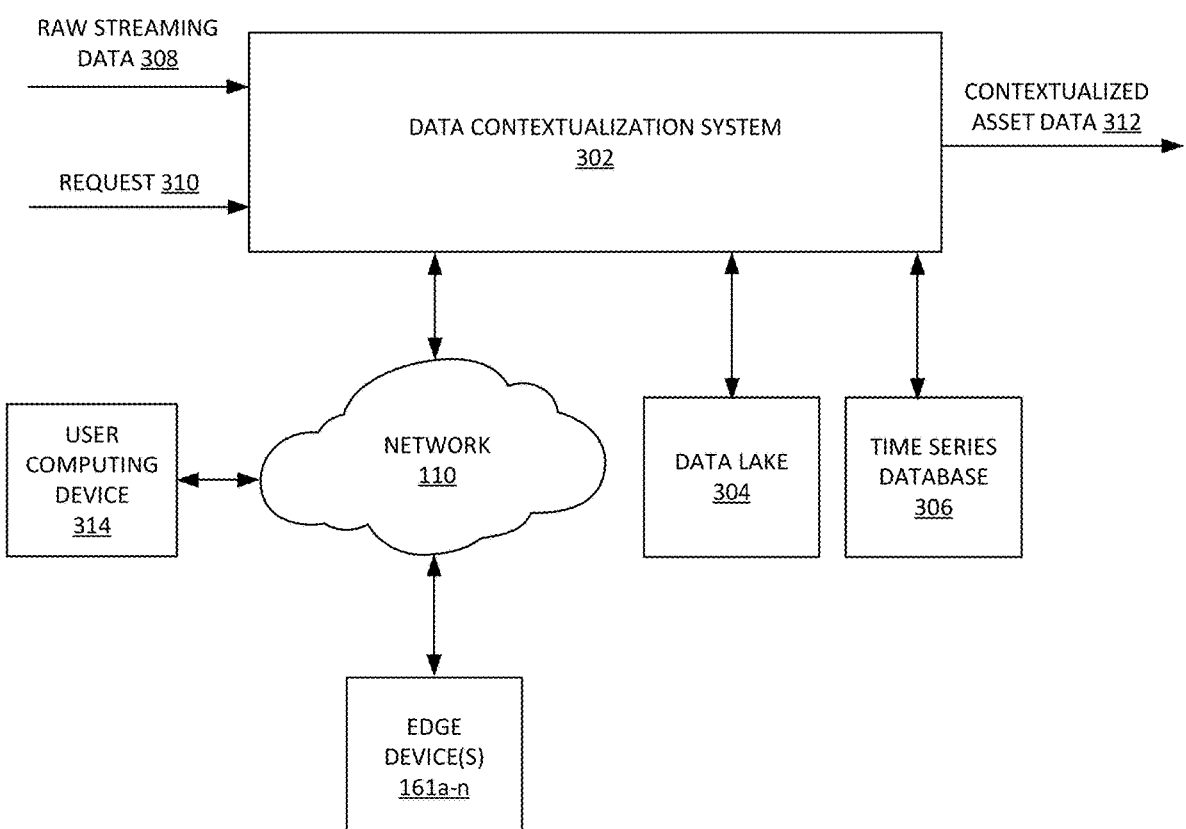
DATA CONTEXTUALIZATION SYSTEM
302
CONTEXTUALIZED
ASSET DATA 312
USER
COMPUTING
DEVICE
314
NETWORK
110
DATA LAKE
304
TIME SERIES
DATABASE
306
EDGE
DEVICE(S)
161a-n
FIG. 3

500

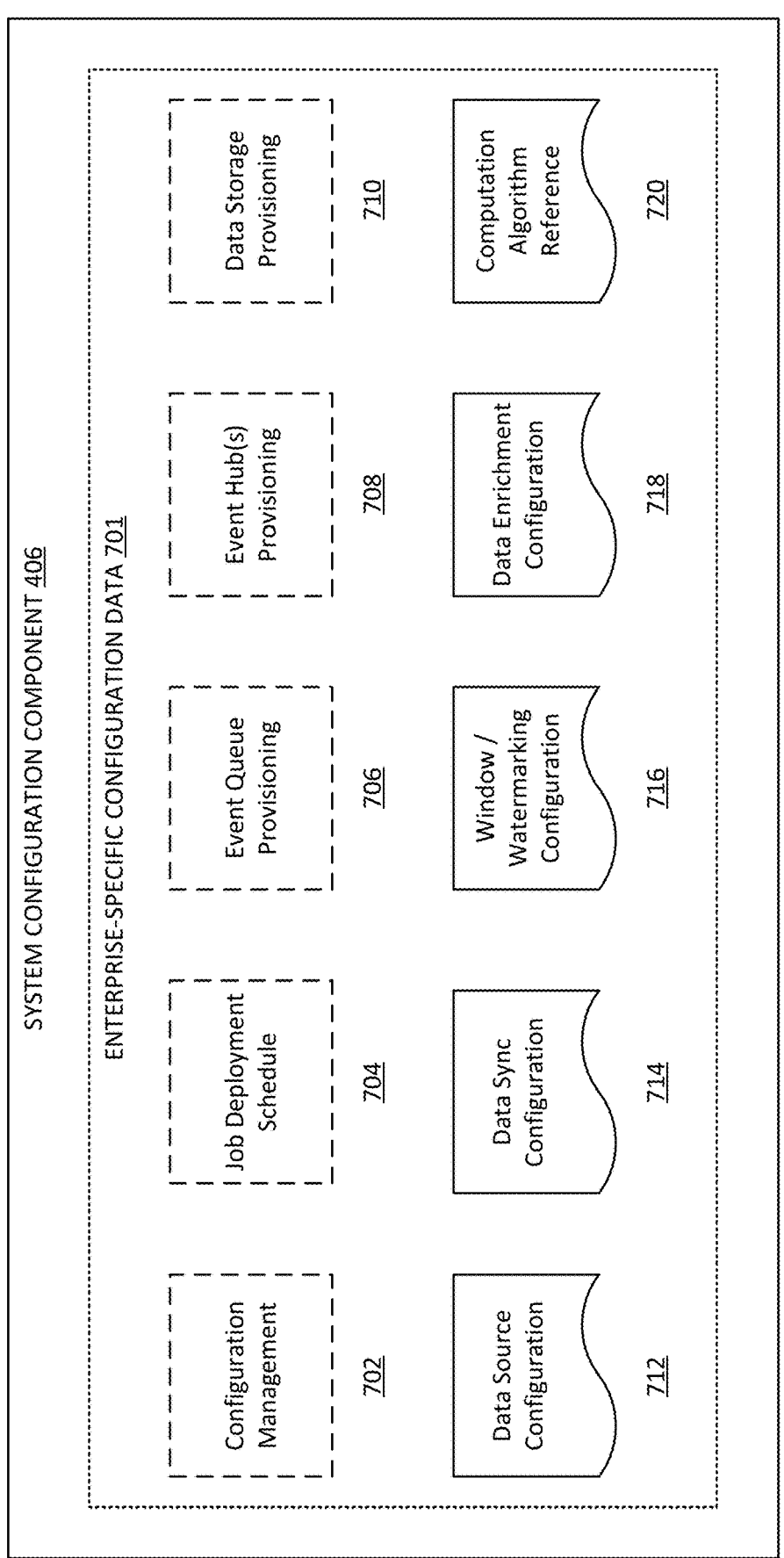

SYSTEM CONFIGURATION COMPONENT 406

ENTERPRISE-SPECIFIC CONFIGURATION DATA 701

Configuration Management 702

Job Deployment Schedule 704

Event Queue Provisioning 706

Event Hub(s) Provisioning 708

Data Storage Provisioning 710

Data Source Configuration 712

Data Sync Configuration 714

Window / Watermarking Configuration 716

Data Enrichment Configuration 718

Computation Algorithm Reference 720

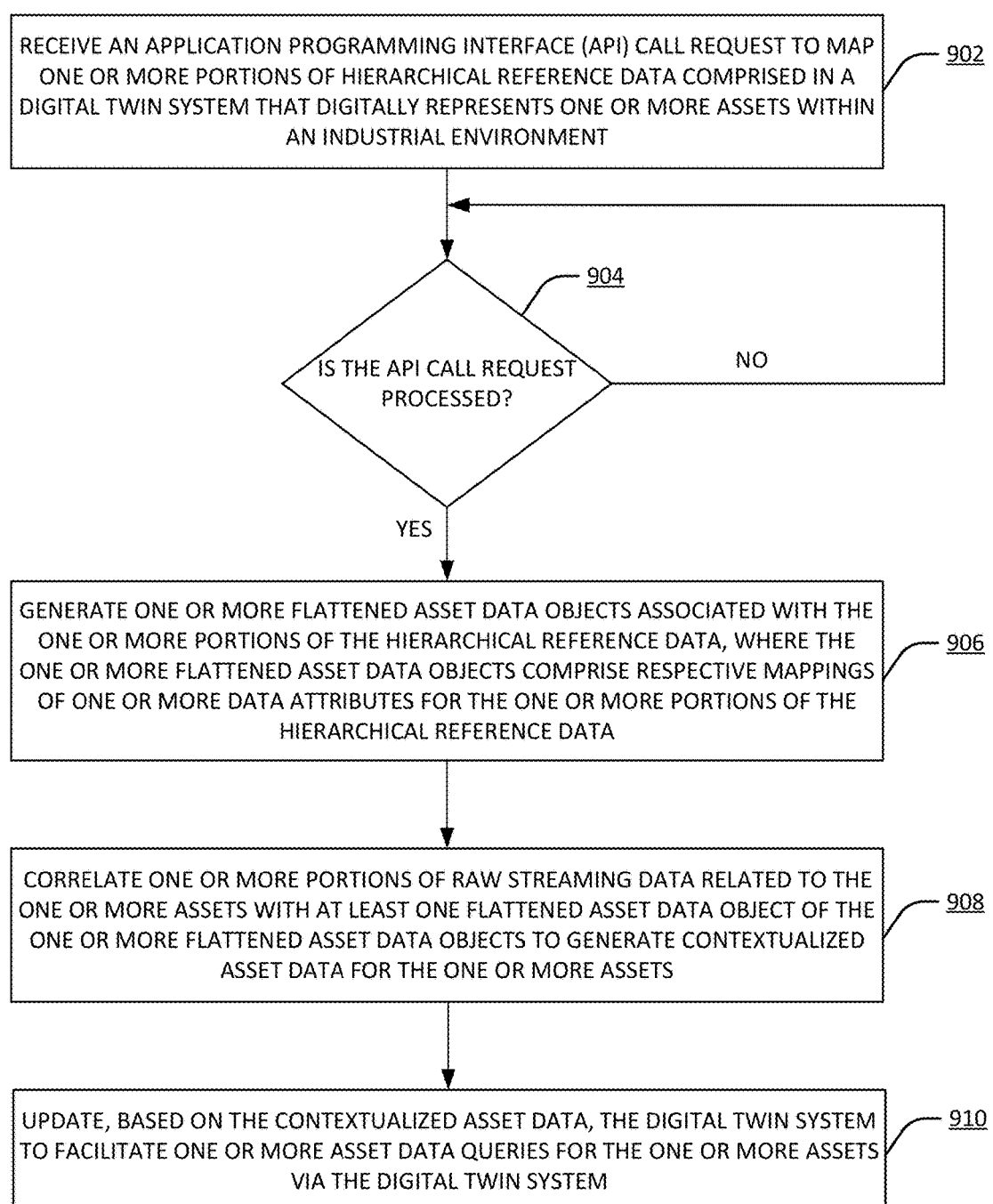

RECEIVE AN APPLICATION PROGRAMMING INTERFACE (API) CALL REQUEST TO MAP ONE OR MORE PORTIONS OF HIERARCHICAL REFERENCE DATA COMPRISED IN A DIGITAL TWIN SYSTEM THAT DIGITALLY REPRESENTS ONE OR MORE ASSETS WITHIN AN INDUSTRIAL ENVIRONMENT — 902

IS THE API CALL REQUEST PROCESSED? — 904

NO

YES

GENERATE ONE OR MORE FLATTENED ASSET DATA OBJECTS ASSOCIATED WITH THE ONE OR MORE PORTIONS OF THE HIERARCHICAL REFERENCE DATA, WHERE THE ONE OR MORE FLATTENED ASSET DATA OBJECTS COMPRISE RESPECTIVE MAPPINGS OF ONE OR MORE DATA ATTRIBUTES FOR THE ONE OR MORE PORTIONS OF THE HIERARCHICAL REFERENCE DATA — 906

CORRELATE ONE OR MORE PORTIONS OF RAW STREAMING DATA RELATED TO THE ONE OR MORE ASSETS WITH AT LEAST ONE FLATTENED ASSET DATA OBJECT OF THE ONE OR MORE FLATTENED ASSET DATA OBJECTS TO GENERATE CONTEXTUALIZED ASSET DATA FOR THE ONE OR MORE ASSETS — 908

UPDATE, BASED ON THE CONTEXTUALIZED ASSET DATA, THE DIGITAL TWIN SYSTEM TO FACILITATE ONE OR MORE ASSET DATA QUERIES FOR THE ONE OR MORE ASSETS VIA THE DIGITAL TWIN SYSTEM — 910

FIG. 9

```
{
  "isSuppliedBy": {
    "hcb-hvac.AirHandlingUnit": [
      {
        "som.label": "AHU4",
        "_parentClassNames": {
          "hcb-hvac.AirHandlingUnit"
        },
        "som.guid": "customer.i6b1e356d-9edb-4a07-aef6-5f1243388420",
        "_classNames": [
          "iot.Object",
          "iot.Asset",
          "hcb-core.DistributionElement",
          "hcb-core.DistributionFlowElement",
          "hcb-core.Element",
          "hcb-core.EnergyConversionDevice",
          "hcb-core.UnitaryEquipment",
          "hcb-hvac.AirHandlingUnit"
        ]
      }
    ]
  },
  "som.label": "VAV58",
  "som.guid": "customer.ia6427df4-acae-4cc2-a0bc-09a488041fe6",
  "_classNames": [
    "iot.Object",
    "iot.Asset",
    "hcb-core.DistributionElement",
    "hcb-core.DistributionFlowElement",
    "hcb-core.Element",
    "hcb-core.FlowController",
    "hcb-hvac.VariableAirVolume"
  ],
  "spaces": {
    "iot.PhysicalSpatialElement": [
      {
        "som.label": "Floor3",
        "_parentClassNames": {
          "iot.PhysicalSpatialElement"
        },
        "som.guid": "customer.i4132e681-bfa0-48d9-bcf0-281fe751ec30",
        "_classNames": [
          "iot.Object",
          "iot.SpatialElement",
          "iot.PhysicalSpatialElement",
          "iot.NonGeographicRegion"
        ]
      }
    ]
  },
```

From FIG. 10A

```
      "location": {                                                    ←1000
        "iot.PhysicalSpatialElement": [
          {
            "som.label": "CF31",
            "_parentClassNames": [
              "iot.PhysicalSpatialElement"
            ],
            "som.guid": "customer.i4768d36e-6fab-45e1-9e07-377b670532f5",
            "_classNames": [
              "iot.Object",
              "iot.SpatialElement",
              "iot.PhysicalSpatialElement",
              "iot.NonGeographicRegion"
            ]
          }
        ]
      },
      "_parentClassNames": [
        "hcb-hvac.VariableAirVolume"
      ],
      "points": [
        {
          "som.label": "point273",
          "som.guid": "customer.id6a5e2cd-ea46-448f-9bec-e16fd17bc64d",
          "iot.samplingTime": 60,
          "iot.isActive": true,
          "iot.isStored": true,
          "_classNames": [
            "iot.AttributeValue",
            "iot.PhysicalPoint",
            "iot.Point"
          ],
          "iot.timeSeriesIdInBMS": "point273",
          "_parentClassNames": [
            "iot.PhysicalPoint"
          ],
          "gateway": {
            "iot.gatewayTypeName": "Niagara",
            "som.label": "Gateway",
            "som.guid": "customer.if6ad1c01-df95-4d6c-adb6-c98d1e84383a",
            "_classNames": [
              "iot.Object",
              "iot.Asset",
              "iot.Gateway",
              "iot.DataSource"
            ],
            "iot.serverAddress": "e06a629c-760b-4da1-b068-d36d8783b030",
            "_parentClassNames": [
              "iot.Gateway"
            ]
          }
        }
      },
```

From FIG. 10B

To FIG. 10D

```
{
  "som.label": "point292",
  "role": {
    "som.dataTypeName": "Float",
    "iot.attributeSourceTypeName": "iot.Measured",
    "iot.defaultUnitName": "unit.KiloPascal",
    "iot.defaultImperialUnitName": "unit.PoundPerInch",
    "hcb-core.signalDirectionTypeName": "hcb-core.Input",
    "hcb-core.measureSubtypeName": "hcb-core.DifferentialPressureMeasureSubtype",
    "iot.attributeValueTypeName": "iot.Raw",
    "unit.measureTypeName": "unit.ForcePerArea",
    "_parentClassNames": [
      "iot.BaseAttribute"
    ],
    "hcb-core.elementTypeName": "hcb-hvac.Filter",
    "hcb-core.signalTypeName": "hcb-core.Analog",
    "iot.defaultMetricUnitName": "unit.KiloPascal",
    "som.label": "Filter Differential Pressure",
    "hcb-core.measureTypeName": "hcb-core.Pressure",
    "_classNames": [
      "iot.Attribute",
      "iot.BaseAttribute"
    ],
    "hcb-core.controlPointFunctionTypeName": "hcb-core.PresentValueControlPointFunction",
    "som.name": "hcb-hvac.FilterDifferentialPressure"
  },
  "som.guid": "customer.id655bc76-2923-406a-91fd-72eced4035c2",
  "iot.samplingTime": 60,
  "iot.isActive": true,
  "iot.isStored": true,
  "_classNames": [
    "iot.AttributeValue",
    "iot.PhysicalPoint",
    "iot.Point"
  ],
  "iot.timeSeriesIdInBMS": "point292",
  "_parentClassNames": [
    "iot.PhysicalPoint"
  ],
  "gateway": {
    "iot.gatewayTypeName": "Niagara",
    "som.label": "Gateway",
    "som.guid": "customer.if6ad1c01-df95-4d6c-adb6-c98d1e84383a",
    "_classNames": [
      "iot.Object",
      "iot.Asset",
      "iot.Gateway",
      "iot.DataSource"
    ],
    "iot.serverAddress": "e06a629c-760b-4da1-b068-d36d8783b030",
    "_parentClassNames": [
      "iot.Gateway"
    ]
  }
},
```

From FIG. 10C

1000

```
{
  "som.label": "point81",
  "role": {
    "som.dataTypeName": "Float",
    "iot.attributeSourceTypeName": "iot.Measured",
    "hcb-core.materialTypeName": "hcb-core.CondenserWater",
    "iot.defaultUnitName": "unit.DegreeCelsius",
    "iot.defaultImperialUnitName": "unit.DegreeFahrenheit",
    "hcb-core.signalDirectionTypeName": "hcb-core.Value",
    "iot.attributeValueTypeName": "iot.Raw",
    "unit.measureTypeName": "unit.Temperature",
    "_parentClassNames": [
      "iot.BaseAttribute"
    ],
    "hcb-core.elementTypeName": "hcb-hvac.Condenser",
    "hcb-core.distributionFunctionTypeName": "hcb-hvac.MaterialReturnFunction",
    "hcb-core.signalTypeName": "hcb-core.Analog",
    "iot.defaultMetricUnitName": "unit.DegreeCelsius",
    "som.label": "Condenser Water Supply to Chiller Temp Setpoint",
    "hcb-core.measureTypeName": "hcb-core.Temperature",
    "_classNames": [
      "iot.Attribute",
      "iot.BaseAttribute"
    ],
    "hcb-core.controlPointFunctionTypeName": "hcb-core.SetpointControlPointFunction",
    "som.name": "hcb-hvac.CondenserWaterReturnToChillerTempSetpoint_AOC"
  },
  "som.guid": "customer.id60541cd-9afc-4c00-8d9c-8dc7685d3e6f",
  "iot.isActive": true,
  "iot.samplingTime": 60,
  "iot.isStored": true,
  "_classNames": [
    "iot.AttributeValue",
    "iot.PhysicalPoint",
    "iot.Point"
  ],
  "iot.timeSeriesIdInBMS": "point81",
  "_parentClassNames": [
    "iot.PhysicalPoint"
  ],
  "gateway": {
    "iot.gatewayTypeName": "Niagara",
    "som.label": "Gateway",
    "som.guid": "customer.if6ad1c01-df95-4d6c-adb6-c98d1e84383a",
    "_classNames": [
      "iot.Object",
      "iot.Asset",
      "iot.Gateway",
      "iot.DataSource"
    ],
    "iot.serverAddress": "e06a629c-760b-4da1-b068-d36d8783b030",
    "_parentClassNames": [
      "iot.Gateway"
    ]
  },
  "iot.localValueTransform": {
    "0": "AlarmOff",
    "1": "AlarmOn",
    "2": "Auto",
    "3": "Manual"
  }
}
]
}
```

FIG. 10D

```
root
  | - som.guid:string  ◄───────────────────────────────── 618a
  | - som.label:string ◄───────────────────────────────── 618b
  | - points:gateway:iot.gatewayTypeName:string
  | - points:gateway:iot.serverAddress:string
  | - points:gateway:som.guid:string
  | - points:gateway:som.label:string
  | - points:iot.isActive:boolean
  | - points:iot.isStored:boolean
  | - points:iot.localValueTransform:0:string
  | - points:iot.localValueTransform:1:string
  | - points:iot.localValueTransform:2:string
  | - points:iot.localValueTransform:3:string
  | - points:iot.samplingTime:long
  | - points:iot.timeSeriesIdInBMS:string
  | - points:role:hcb-core.computationTypeName:string
  | - points:role:hcb-core.controlPointFunctionTypeName:string
  | - points:role:hcb-core.dataSourceTypeName:string
  | - points:role:hcb-core.distributionFunctionTypeName:string
  | - points:role:hcb-core.distributionLocationTypeName:string
  | - points:role:hcb-core.elementAssemblyStateTypeName:string
  | - points:role:hcb-core.elementStateTypeName:string
  | - points:role:hcb-core.elementTypeName:string
  | - points:role:hcb-core.limitTypeName:string
  | - points:role:hcb-core.logicalControlElementTypeName:string
  | - points:role:hcb-core.materialStateTypeName:string
  | - points:role:hcb-core.materialTypeName:string
  | - points:role:hcb-core.measureSubtypeName:string
  | - points:role:hcb-core.measureTypeName:string
  | - points:role:hcb-core.physicalControlElementTypeName:string
  | - points:role:hcb-core.portDirectionTypeName:string
  | - points:role:hcb-core.signalDirectionTypeName:string
  | - points:role:hcb-core.signalTypeName:string
  | - points:role:iot.attributeSourceTypeName:string
  | - points:role:iot.attributeValueTypeName:string
  | - points:role:iot.defaultImperialUnitName:string
  | - points:role:iot.defaultMetricUnitName:string
  | - points:role:iot.defaultUnitName:string
  | - points:role:som.dataTypeName:string
  | - points:role:som.label:string
  | - points:role:som.name:string
  | - points:role:unit.measureTypeName:string
  | - points:som.guid:string
  | - points:som.label:string
  | - isSuppliedBy:hcb-hvac.AirHandlingUnit:_parentClassNames:string
  | - isSuppliedBy:hcb-hvac.AirHandlingUnit:som.guid:array
  |    | - element:string
  | - isSuppliedBy:hcb-hvac.AirHandlingUnit:som.label:array
  |    | - element:string
  | - isSuppliedBy:hcb-hvac.ChilledWaterPlant:_parentClassNames:string
  | - isSuppliedBy:hcb-hvac.ChilledWaterPlant:som.guid:array
  |    | - element:string
  | - isSuppliedBy:hcb-hvac.ChilledWaterPlant:som.label:array
  |    | - element:string
  | - isSuppliedBy:hcb-hvac.Chiller:_parentClassNames:string
  | - isSuppliedBy:hcb-hvac.Chiller:som.guid:array
  |    | - element:string
  | - isSuppliedBy:hcb-hvac.Chiller:som.label:array
  |    | - element:string
  | - location:iot.PhysicalSpatialElement:_parentClassNames:string
  | - location:iot.PhysicalSpatialElement:som.guid:array
  |    | - element:string
```

FIG. 11A

From FIG. 11A

From FIG. 11A

```
| - location:iot.PhysicalSpatialElement:som.label:array
|     | - element:string
| - location:iot.Site:_parentClassNames:string
| - location:iot.Site:iot.timeZone:array
|     | - element:string
| - location:iot.Site:iot.usesMetricSystem:array
| - element:boolean
| - location:iot.Site:som.guid:array
|     | - element:string
| - location:iot.Site:som.label:array
|     | - element:string
| - spaces:iot.PhysicalSpatialElement:_parentClassNames:string
| - spaces:iot.PhysicalSpatialElement:som.guid:array
|     | - element:string
| - spaces:iot.PhysicalSpatialElement:som.label:array
|     | - element:string
| - spaces:iot.Site:_parentClassNames:string
| - spaces:iot.Site:iot.timeZone:array
|     | - element:string
| - spaces:iot.Site:iot.usesMetricSystem:array
| - element:boolean
| - spaces:iot.Site:som.guid:array
|     | - element:string
| - spaces:iot.Site:som.label:array
|     | - element:string
| - supplies:hcb-hvac.AirHandlingUnit:_parentClassNames:string
| - supplies:hcb-hvac.AirHandlingUnit:som.guid:array
|     | - element:string
| - supplies:hcb-hvac.AirHandlingUnit:som.label:array
|     | - element:string
| - supplies:hcb-hvac.Chiller:_parentClassNames:string
| - supplies:hcb-hvac.Chiller:som.guid:array
|     | - element:string
| - supplies:hcb-hvac.Chiller:som.label:array
|     | - element:string
| - supplies:hcb-hvac.FanCoilUnit:_parentClassNames:string
| - supplies:hcb-hvac.FanCoilUnit:som.guid:array
|     | - element:string
| - supplies:hcb-hvac.FanCoilUnit:som.label:array
|     | - element:string
| - supplies:hcb-
hvac.VariableAirVolume:_parentClassNames:string
| - supplies:hcb-hvac.VariableAirVolume:som.guid:array
|     | - element:string
| - supplies:hcb-hvac.VariableAirVolume:som.label:array
|     | - element:string
| - _parentClassNames:string
| - points:_parentClassNames:string
| - points:gateway:_parentClassNames:string
| - points:role:_parentClassNames:string
```

| eomCustomerId | serverAddress | calculationId | windowPeriod | slidingInterval | watermark |
|---|---|---|---|---|---|
| idf0a29149-660a-4493-bba1-f3ffa4388070 | d0deebd1-1a03-4696-aff8-7aa13f63f913 | energy_cleanser | 2 | 3 | 0 |

1202　　1204　　1206　　1208　　1210　　1212

1200

Figure 13A:
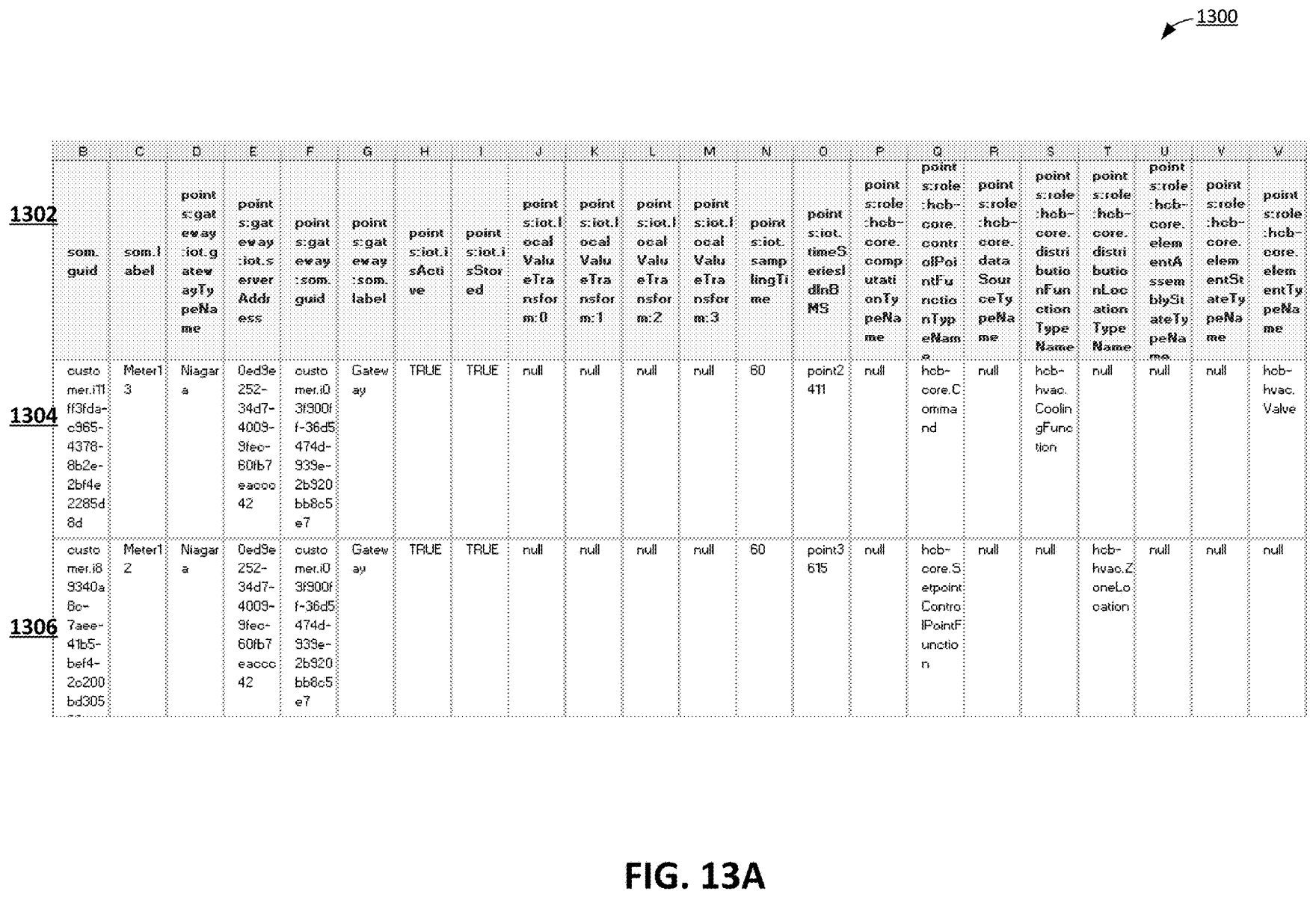

1300

| | som. guid | som.l abel | point s.gat eway iot.g atew ayTy peNa me | point s.gat eway iot.s erver Addr ess | point s.gat eway som. guid | point s.gat eway som. label | point s.iot.i s.Acti ve | point s.iot.i s.Stor ed | point s.iot.l ocal Valu eTra nsfor m:0 | point s.iot.l ocal Valu eTra nsfor m:1 | point s.iot.l ocal Valu eTra nsfor m:2 | point s.iot.l ocal Valu eTra nsfor m:3 | point s.iot. samp lingTi me | point s.iot. timeS eriesl dInB MS | point s.role .hcb- core. comp utati onTy peNa me | point s.role .hcb- core. contr olPoi ntFu nctio nTyp eNam e | point s.role .hcb- core. data Sour ceTy peNa me | point s.role .hcb- core. distri butio nFun ction Type Name | point s.role .hcb- core. distri butio nLoc ation Type Name | point s.role .hcb- core. elem entA ssem blySt ateTy peNa me | point s.role .hcb- core. elem entSt ateTy peNa me | point s.role .hcb- core. elem entTy peNa me |
|---|---|---|---|---|---|---|---|---|---|---|---|---|---|---|---|---|---|---|---|---|---|---|
| 1304 | custo mer.it1 ff3fda- c965- 4378- 8b2e- 2bf4e 2285d 8d | Meter1 3 | Niagar a | 0ed9e 252- 34d7- 4009- 9fec- 601b7 eaooe 42 | custo mer.i0 3f900f f-36d5 474d- 939e- 2b920 bb8c5 e7 | Gatew ay | TRUE | TRUE | null | null | null | null | 60 | point2 411 | null | hcb- core.C omma nd | null | hcb- hvac. Coolin gFunc tion | null | null | null | hcb- hvac. Valve |
| 1306 | custo mer.i8 9340a 8o- 7aee- 41b5- bef4- 2o200 bd305 ... | Meter1 2 | Niagar a | 0ed9e 252- 34d7- 4009- 9fec- 601b7 eaooe 42 | custo mer.i0 3f900f f-36d5 474d- 939e- 2b920 bb8c5 e7 | Gatew ay | TRUE | TRUE | null | null | null | null | 60 | point3 6t5 | null | hcb- core.S etpoint Contro IPointF unctio n | null | null | hcb- hvac.Z oneLo cation | null | null | null |

| | X | Y | Z | AA | AB | AC | AD | AE | AF | AG | AH | AI | AJ | AK | AL | AM | AN | AO | AP | AQ | AR |
|---|---|---|---|---|---|---|---|---|---|---|---|---|---|---|---|---|---|---|---|---|---|
| | point. strole. :hcb-core. limitT ypeN ame | point strole :hcb-core. logic alCo ntrol Elem entTy peNa me | point strole :hcb-core. mater ialSt ateTy peNa me | point strole :hcb-core. mater ialTy peNa me | point strole :hcb-core. meas ureS ubtyp eNam e | point strole :hcb-core. meas ureTy peNa me | point strole :hcb-core. physi calC ontro lElem entTy peNa me | point strole :hcb-core. portD irecti onTy peNa me | point strole :hcb-core. signa lDire ction Type Name | point strole :hcb-core. signa lType Name | point strole :iot.a ttribu teSo urce Type Name | point strole :iot.a ttribu teVal ueTy peNa me | point strole :iot.d efaul tImpe rialU nitNa me | point strole :iot.d efaul tMetri cUnit Name | point strole :iot.d efaul tUnit Name | point strole :som. data Type Name | point strole :som. label | point strole :iot.so m.nam e | point strole :unit. meas ureTy peNa me | point :ssom. guid | point :ssom. m.lab el |
| 1302 | null | null | null | null | null | null | null | null | | | | | | | | | | | | | |
| 1304 | null | null | null | hcb-core.A ir | null | hcb-core.B inarySt ate | null | null | hcb-core.O utput | hcb-core.D igital | iot.Me asured | iot.Ra w | unit.U nitless | unit.D nitless | unit.U nitless | null | Coolin g Valve On-Off Comm and | hcb-hvac. Coolin gValve Comm andOn | unit.Di mensi onless | custo mer.iff 91d28 8-98cf-4084- 81d8- c1b03f a00ab b | point2 411 |
| 1306 | null | null | null | hcb-core.A ir | null | hcb-core.T emper ature | null | null | hcb-core.V alue | hcb-core.A nalog | iot.Me asured | iot.Ra w | unit.D egree Fahre nheit | unit.D egree Celsiu s | unit.D egree Celsiu s | Float | Zone Tempe rature Setpoi nt | hcb-hvac.Z oneTe mperat ureSet point | unit.Te mperat ure | custo mer.iff 94313 5-2adf 4084- b46a- b7e9d 33222 47 | point3 615 |

Figure 13C:
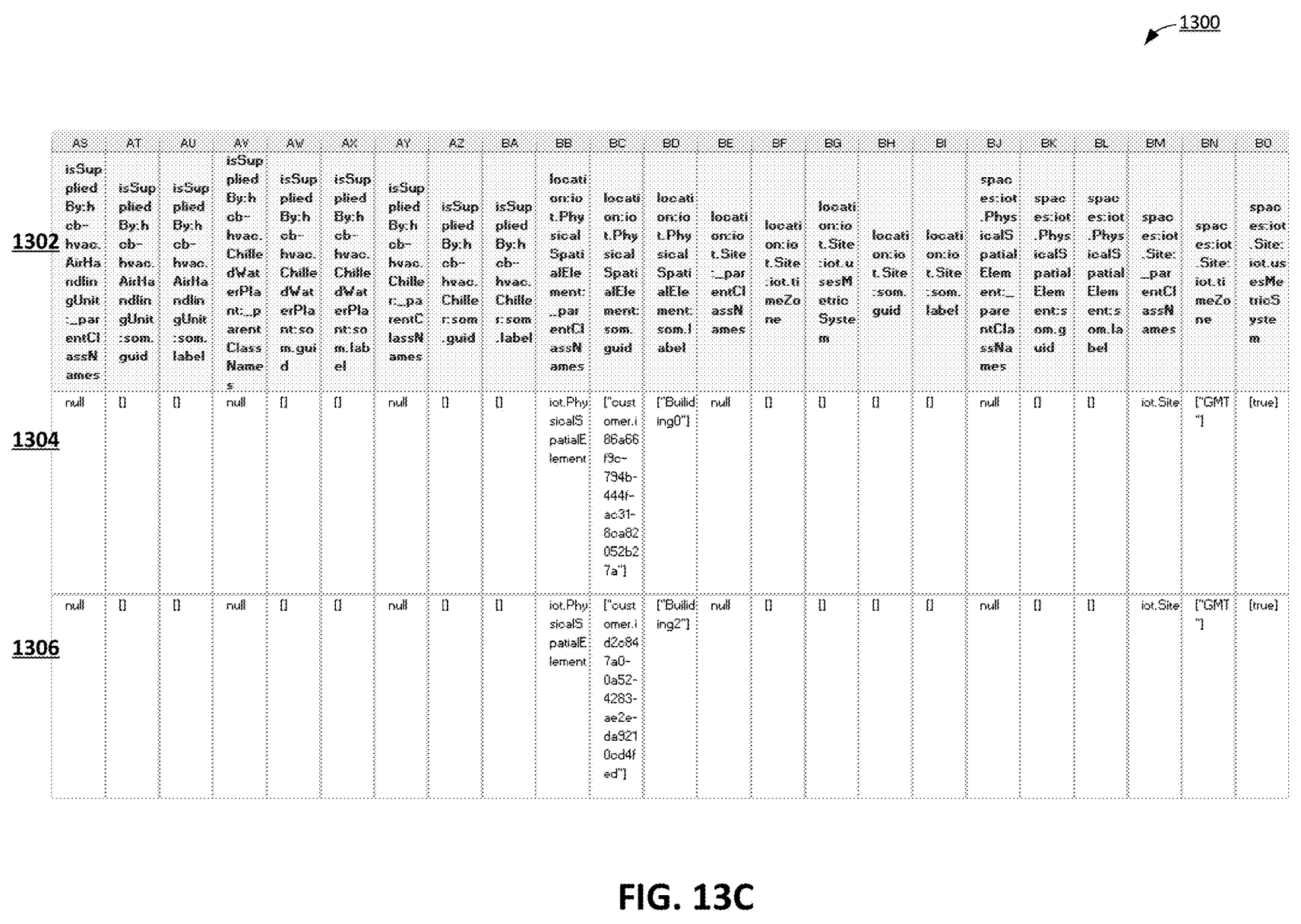

| | AS | AT | AU | AV | AW | AX | AY | AZ | BA | BB | BC | BD | BE | BF | BG | BH | BI | BJ | BK | BL | BM | BN | BO |
|---|----|----|----|----|----|----|----|----|----|----|----|----|----|----|----|----|----|----|----|----|----|----|----|
| header | isSupplied By:hcb-hvac.AirHandlingUnit_parentClassNames | isSupplied By:hcb-hvac.AirHandlingUnit:som.guid | isSupplied By:hcb-hvac.AirHandlingUnit:som.label | isSupplied By:hcb-hvac.ChilledWaterPlant...parentClassNames | isSupplied By:hcb-hvac.ChilledWaterPlant:som.guid | isSupplied By:hcb-hvac.ChilledWaterPlant:som.label | isSupplied By:hcb-hvac.Chiller_parentClassNames | isSupplied By:hcb-hvac.Chiller:som.guid | isSupplied By:hcb-hvac.Chiller:som.label | location:iot.PhysicalSpatialElement:_parentClassNames | location:iot.PhysicalSpatialElement:som.guid | location:iot.PhysicalSpatialElement:som.label | location:iot.Site_parentClassNames | location:iot.Site iot.timeZone | location:iot.Site iot.usesMetricSystem | location:iot.Site:som.guid | location:iot.Site:som.label | spaces:iot.PhysicalSpatialElement:_parentClassNames | spaces:iot.PhysicalSpatialElement:som.guid | spaces:iot.PhysicalSpatialElement:som.label | spaces:iot.Site:_parentClassNames | spaces:iot.Site iot.timeZone | spaces:iot.Site iot.usesMetricSystem |
| 1302 | null | [] | [] | null | [] | [] | null | [] | [] | iot.PhysicalSpatialElement | ["customer.i86a66f9c-794b-444f-ac31-8ca82052b27a"] | ["Building0"] | null | [] | [] | [] | [] | null | [] | [] | iot.Site | ["GMT"] | [true] |
| 1304 | null | [] | [] | null | [] | [] | null | [] | [] | | | | | | | | | | | | | | |
| 1306 | null | [] | [] | null | [] | [] | null | [] | [] | iot.PhysicalSpatialElement | ["customer.id2c847a0-0a52-4283-ae2e-da3210cd4fed"] | ["Building2"] | null | [] | [] | [] | [] | null | [] | [] | iot.Site | ["GMT"] | [true] |

STREAMING DATA CONTEXTUALIZATION FOR INDUSTRIAL ASSETS

TECHNICAL FIELD

The present disclosure generally relates to digitally transforming data related to industrial assets in an industrial environment, and more particularly to mapping hierarchical reference data associated with the industrial assets and contextualizing raw streaming data generated by the industrial assets.

BACKGROUND

An industrial environment generally includes physical assets such machines, sensors, equipment, computing devices, and/or other types of industrial assets configured to execute one or more industrial processes. These industrial assets typically generate, calculate, collect, and/or otherwise obtain various types of data related to the one or more industrial processes and output the data in a raw streaming format to one or more computing devices and/or one or more storage devices associated with an industrial enterprise related to the industrial environment. However, Applicant has discovered many technological inefficiencies related to traditional methods directed towards contextualizing raw industrial data.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive an application programming interface (API) call request to map one or more portions of hierarchical reference data comprised in a digital twin system that digitally represents one or more assets within an industrial environment. The one or more programs also comprise instructions configured to, in response to the API call request, generate one or more flattened asset data objects associated with the one or more portions of the hierarchical reference data, where the one or more flattened asset data objects comprise respective mappings of one or more data attributes for the one or more portions of the hierarchical reference data. The one or more programs also comprise instructions configured to correlate one or more portions of raw streaming data related to the one or more assets with at least one flattened asset data object of the one or more flattened asset data objects to generate contextualized asset data for the one or more assets. The one or more programs also comprise instructions configured to update, based on the contextualized asset data, the digital twin system to facilitate one or more asset data queries for the one or more assets via the digital twin system.

The system further comprises where the one or more portions of the hierarchical reference data comprised in the digital twin system are structured in a knowledge graph associated with the one or more assets within the industrial environment.

The system further comprises where the one or more programs comprising the instructions configured to generate the one or more flattened asset data objects associated with the one or more respective portions of the hierarchical reference data are further configured to traverse one or more data nodes associated with the knowledge graph to parse the one or more portions of the hierarchical reference data associated with the one or more respective assets, where traversing the knowledge graph comprises sequentially executing one or more knowledge graph API calls.

The system further comprises where the one or more data attributes are associated with respective parsed nodes of the knowledge graph.

The system further comprises where the one or more data attributes comprised by the one or more flattened asset data objects related to the one or more assets comprise at least one of an asset identifier, an asset role, an asset manufacturer identifier, a corresponding engineering unit identifier, an asset location, an asset sensor point identifier, an asset sensor type, an asset sensor measurement value, a user identifier, a change event identifier, or a timestamp.

The system further comprises where the one or more programs further comprise instructions configured to identify a change event with respect to the hierarchical reference data, where the change event is associated with an alteration to the one or more portions of the hierarchical reference data associated with the one or more respective assets. The one or more programs also comprise instructions configured to reconfigure, based on the change event, the one or more respective flattened asset data objects associated with the one or more portions of the hierarchical reference data.

The system further comprises where the instructions configured to correlate the one or more portions of raw streaming data related to the one or more assets with the at least one flattened asset data object of the one or more flattened asset data objects to generate the contextualized asset data are further configured to join the one or more portions of raw streaming data with the at least one of the one or more flattened asset data objects.

The system further comprises where the one or more portions of raw streaming data are associated with one or more respective industrial processes executed at least in part by the one or more assets.

The system further comprises where at least one portion of the one or more portions of raw streaming data comprises identifier data associated with one or more component parts of the one or more respective assets, sensor data captured by one or more sensor points associated with the one or more respective assets, calculation data computed by one or more processors associated with the one or more respective assets, or measurement data captured by one or more measurement devices associated with the one or more respective assets.

The system further comprises where the one or more programs further comprise instructions configured to cause storage of the one or more portions of raw streaming data related to the one or more assets in a database configured as a data lake.

The system further comprises where the one or more programs further comprise instructions configured to cause storage of the contextualized asset data in a database configured as a time series database.

The system further comprises where the one or more programs further comprise instructions configured to generate an interactive tabular representation of the contextualized asset data for rendering via a graphical user interface.

In another embodiment, a computer-implemented method comprises receiving an API call request to map one or more portions of hierarchical reference data comprised in a digital twin system that digitally represents one or more assets within an industrial environment. The computer-implemented method also comprises, in response to the API call request, generating one or more flattened asset data objects associated with the one or more portions of the hierarchical reference data, where the one or more flattened asset data objects comprise respective mappings of one or more data attributes for the one or more portions of the hierarchical reference data. The computer-implemented method also comprises correlating one or more portions of raw streaming data related to the one or more assets with at least one flattened asset data object of the one or more flattened asset data objects to generate contextualized asset data for the one or more assets. The computer-implemented method also comprises updating, based on the contextualized asset data, the digital twin system to facilitate one or more asset data queries for the one or more assets via the digital twin system.

The computer-implemented method further comprises where the one or more portions of the hierarchical reference data comprised in the digital twin system are structured in a knowledge graph associated with the one or more assets within the industrial environment.

The computer-implemented method further comprises where generating the one or more flattened asset data objects associated with the one or more respective portions of the hierarchical reference data further comprises traversing one or more data nodes associated with the knowledge graph to parse the one or more portions of the hierarchical reference data associated with the one or more respective assets. The computer-implemented method also comprises traversing the knowledge graph by sequentially executing one or more knowledge graph API calls.

The computer-implemented method further comprises where the one or more data attributes are associated with respective parsed nodes of the knowledge graph.

The computer-implemented method further comprises where the one or more data attributes comprised by the one or more flattened asset data objects related to the one or more assets comprise at least one of an asset identifier, an asset role, an asset manufacturer identifier, a corresponding engineering unit identifier, an asset location, an asset sensor point identifier, an asset sensor type, an asset sensor measurement value, a user identifier, a change event identifier, or a timestamp.

The computer-implemented method further comprises identifying a change event with respect to the hierarchical reference data, where the change event is associated with an alteration to the one or more portions of the hierarchical reference data associated with the one or more respective assets. The computer-implemented method also comprises reconfiguring, based on the change event, the one or more respective flattened asset data objects associated with the one or more portions of the hierarchical reference data.

The computer-implemented method further comprises where correlating the one or more portions of raw streaming data related to the one or more assets with the at least one flattened asset data object of the one or more flattened asset data objects to generate the contextualized asset data are further comprises joining the one or more portions of raw streaming data with the at least one of the one or more flattened asset data objects.

In yet another embodiment, a computer program product comprises at least one computer-readable storage medium having program instructions embodied thereon. The program instructions are executable by a processor to cause the processor to receive an API request to map one or more portions of hierarchical reference data comprised in a digital twin system that digitally represents one or more assets within an industrial environment. The program instructions are also configured to, in response to the API call request, generate one or more flattened asset data objects associated with the one or more portions of the hierarchical reference data, where the one or more flattened asset data objects comprise respective mappings of one or more data attributes for the one or more portions of the hierarchical reference data. The program instructions are also configured to correlate one or more portions of raw streaming data related to the one or more assets with at least one flattened asset data object of the one or more flattened asset data objects to generate contextualized asset data for the one or more assets. The program instructions are also configured to update, based on the contextualized asset data, the digital twin system to facilitate one or more asset data queries for the one or more assets via the digital twin system.

BRIEF DESCRIPTIONS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 illustrates a system that provides an exemplary environment related to streaming data contextualization for industrial assets, in accordance with one or more embodiments described herein;

FIG. 7 illustrates an exemplary system configuration component of a data contextualization system, in accordance with one or more embodiments described herein;

FIG. 9 illustrates a process flow diagram for contextualizing streaming data for industrial assets, in accordance with one or more embodiments described herein;

FIGS. 10A-10D illustrate exemplary portions of hierarchical reference data, in accordance with one or more embodiments described herein;

FIGS. 11A-11B illustrate exemplary flattened asset data objects, in accordance with one or more embodiments described herein;

Figure 13D:
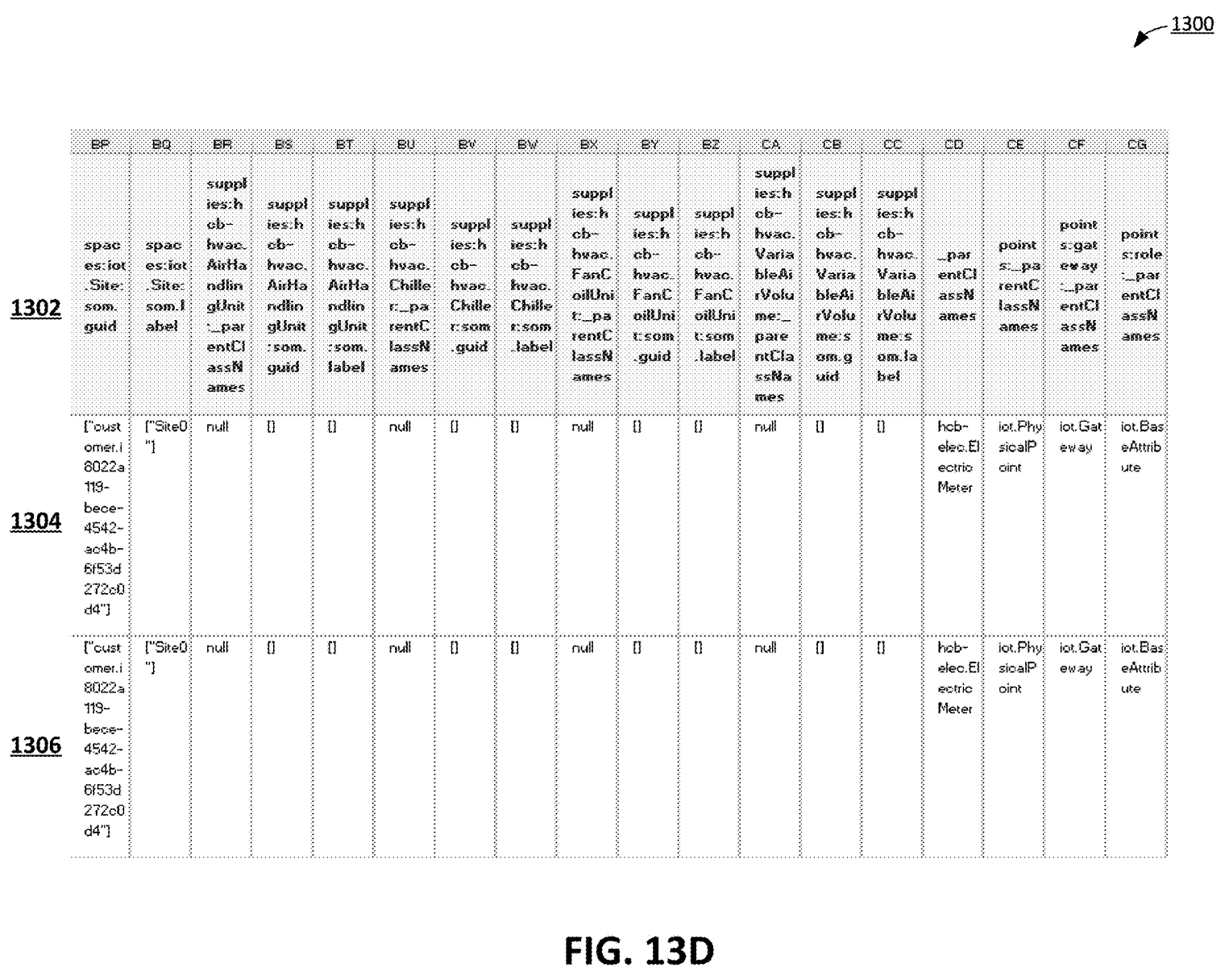

FIGS. 13A-13D illustrate an exemplary time series database representation of contextualized asset data, in accordance with one or more embodiments described herein.

DETAILED DESCRIPTION

Figure 1:
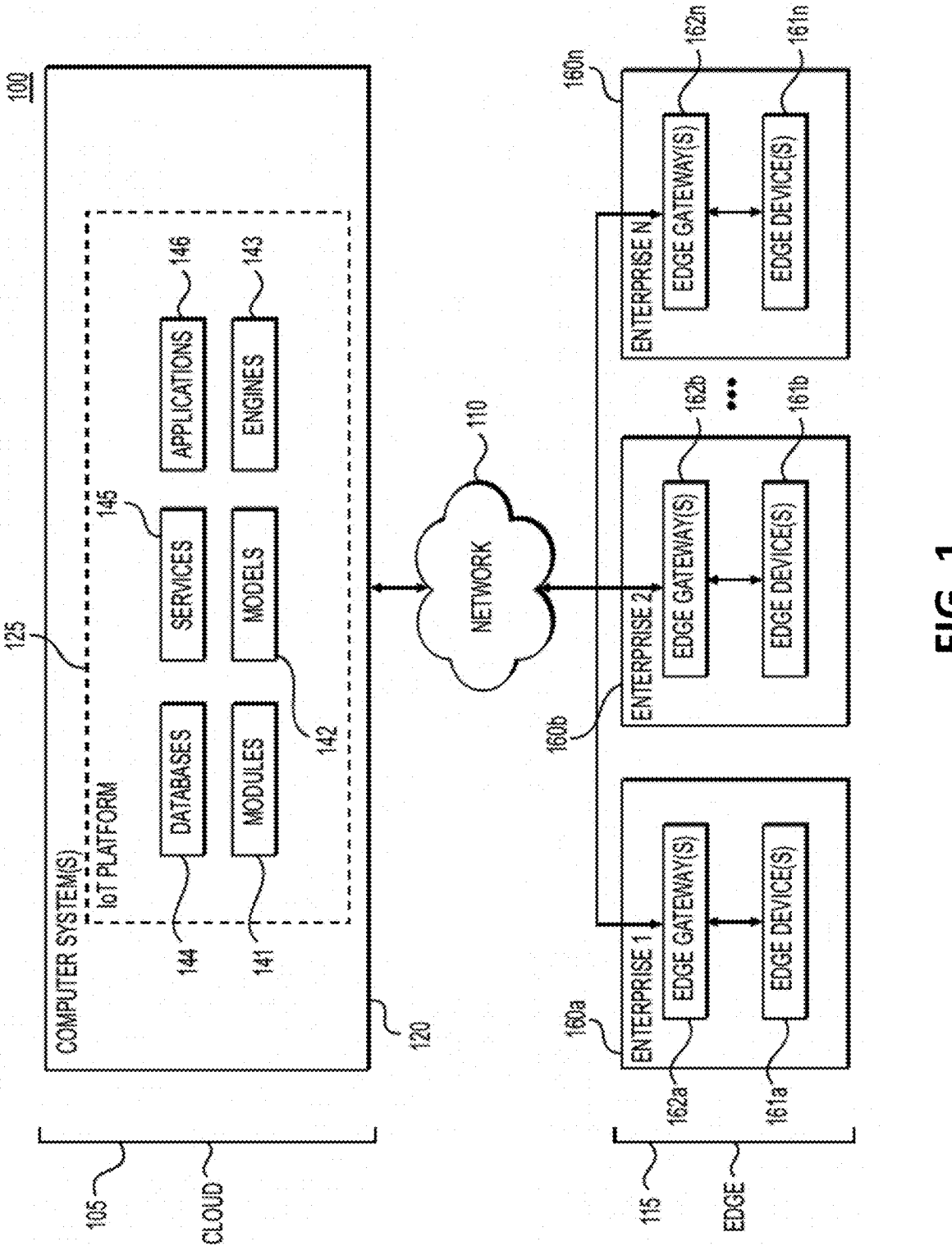
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

An industrial environment generally includes physical assets such machines, sensors, equipment, computing devices, and/or other types of industrial assets configured to execute one or more industrial processes. These industrial assets typically generate, calculate, collect, and/or otherwise obtain various types of data related to the one or more industrial processes and output the data in a raw streaming format to one or more computing devices and/or one or more storage devices associated with an industrial enterprise related to the industrial environment. However, the data configured in this raw streaming format often lacks crucial contextual information such as, for example, locality information regarding sensor points associated with a particular industrial asset. Furthermore, reference data associated with the industrial assets configured in various data structures, such as data objects generated in a hierarchical format, are often ill-configured for contextualizing the industrial asset data that is in the raw streaming format.

Traditional industrial enterprises are beginning to take more advantage of data modeling, data processing, and digital twin systems. For digital twin systems, industrial assets associated with an industrial enterprise are modeled as various digital entities configured in a hierarchical structure in order to establish a clear way of understanding the relationships between the digital entities of the data model. For example, industrial enterprises can use this hierarchical reference data to establish relationships between the industrial assets, industrial processes, and enterprise personnel, as well as to create digital twins of the industrial assets, industrial processes, and enterprise personnel associated with the industrial enterprise.

Therefore, it is important to consider the usage of hierarchical reference data associated with a respective digital twin system in data processing pipelines associated with an industrial enterprise. The industrial assets modeled by such hierarchical reference data continuously generate and/or capture raw streaming data related to one or more industrial processes performed in part by the industrial assets. Such raw streaming data can include, but is not limited to, identifying data associated with one or more component parts of the one or more respective assets, sensor point data, measurement data, calculation data, and/or any relevant operational data associated with a particular industrial process generated by the industrial assets. Such raw streaming data is valuable to an industrial enterprise. However, the raw streaming data can be made exponentially more valuable if the raw streaming data is contextualized with the hierarchical reference data.

As a non-limiting example, raw streaming data related to a sensor point of an industrial asset may not include locality information referencing where the sensor point and/or the industrial asset is located within a particular industrial environment related to an industrial enterprise. This problem is compounded when an industrial enterprise is monitoring multiple industrial environments (e.g., industrial plants) via a communications network. Lack of contextual information such as the aforementioned locality information related to the industrial asset can result in inefficient data processing and/or inefficient and limited data querying. Furthermore, lack of contextual data is detrimental to understanding the current status, health, configuration, output, and/or operation of the one or more industrial assets within an industrial environment.

Thus, to address these and other problems, various embodiments of the present disclosure relate to systems, apparatuses, computer-implemented methods, and computer program products that provide streaming data contextualization for industrial assets. Contextualized asset data has wide range of applications and enables various types of specialized data queries that include, but are not limited to, data queries regarding the identifying information of industrial assets and corresponding sensors, the locality of the industrial assets and corresponding sensor points, the control functions of the industrial assets and sensor points, the engineering units associated with one or more industrial assets, the measurement values captured by the industrial assets and sensor points, and/or the like. Additionally, contextualized asset data can be used to iteratively update a respective digital twin system corresponding to a particular industrial environment in order to monitor, diagnose, troubleshoot, update and/or otherwise improve upon a current configuration of the one or more industrial assets represented by the digital twin system. The various embodiments disclosed herein can reduce computational resources, improve the quality of industrial data generated by industrial assets, and/or contextualize the industrial data such that meaningful data queries related to the industrial data can be made, thereby improving the function, production, and efficiency of an industrial environment and/or a digital twin system.

Various embodiments described herein are directed towards a data contextualization system configured to unite raw streaming data captured and/or generated by one or more industrial assets with the hierarchical reference data corresponding to the one or more industrial assets. The data contextualization system can perform one or more preprocessing steps for mapping and/or de-normalizing the hierarchical reference data to generate one or more respective flattened asset data objects. In various embodiments, the one or more flattened asset data objects are stored in an atomicity, consistency, isolation, and durability (ACID) compliant data lake and/or in a time series database via a message queue.

The preprocessing steps can be performed by running batch reference data sync jobs which fetch and parse the hierarchical reference data into the one or more flattened asset data objects. The flattened asset data objects can also be persisted in the data lake. Once the flattened asset data objects are persisted, the reference data sync job can be terminated (e.g., as the reference data sync job runs in a batch processing mode). The one or more flattened asset data objects can comprise respective mappings of one or more data attributes for the hierarchical reference data associated with one or more respective industrial asset(s) within the industrial environment. The one or more data attributes can comprise at least one of asset identifier, an asset role, an asset manufacturer, a corresponding engineering unit, an asset location, an asset sensor point identifier, an asset sensor type, an asset sensor control function, an asset sensor measurement value, a user identifier, a change event identifier, or a timestamp. Additionally, the one or more data attributes can be associated with one or more respective primitive data types or one or more array formats.

In various embodiments, the hierarchical reference data is comprised in a knowledge graph associated with the one or more industrial assets within the industrial environment. In order to generate the flattened asset data objects, the data contextualization system is configured to traverse the knowledge graph to parse the hierarchical reference data associated with the one or more respective assets. Traversing the knowledge graph comprises making one or more knowledge graph application programming interface (API) calls in a sequentially reactive manner. Various embodiments employ a reactive pagination technique when reading industrial asset and sensor model information from the knowledge graph. As there can be large amounts of data in such knowledge graphs, it is common that an API may time out before all the relevant data is read. To avoid these scenarios, the knowledge graph APIs are configured to read knowledge graph data in a reactive, sequential manner such that all the knowledge graph data is completely read before moving to the subsequent steps of the methods described herein.

In order to generate the flattened asset data objects, the data contextualization system is configured to map, or de-normalize, the hierarchical reference data. Various industrial asset and sensor data comprised in the hierarchical reference data is parsed by starting from the root node of the knowledge graph corresponding to the hierarchical reference data and traversing down to each child node until the child node is of a primitive datatype or an array. The parsed nodes can be mapped and labeled along with the corresponding parent nodes. In this way, flattened asset data objects can be generated and configured to contain various respective data attributes associated with the parsed, mapped, and labeled nodes of the of the knowledge graph associated with the industrial assets within the industrial environment. As a non-limiting example, in various embodiments, the flattened asset data objects can be configured as a string of text where the various data attributes associated with the corresponding industrial assets are appended to the string of text as suffixes separated by a colon. As mentioned above, the one or more flattened asset data objects can be stored in the data lake.

After the industrial assets and sensors of an industrial environment have been mapped and the one or more flattened asset data objects have been generated per the techniques described herein, the flattened asset data objects can be correlated and/or joined with the raw streaming data coming from the corresponding industrial assets and sensor points in real-time. In this way, the raw streaming data can be contextualized and stored in one or more of a data lake and/or a time series database. For example, based on various identifying information such as, for example, data attributes related to industrial asset identifiers, sensor point identifiers, and/or industrial environment globally unique identifiers (GUIDs), one or more flattened asset data objects can be joined with the raw streaming data in order to add more context to the raw streaming data. This is an example of a join condition or database rule. However, various embodiments entail composition of several forms of join conditions as various use cases demand. These join conditions can be a structured query language (SQL) statement that can be configured to augment the joining behavior per various requirements defined by the data contextualization system associated with a particular industrial enterprise.

The contextualized asset data provides detailed information on the industrial assets and corresponding sensors, the locality of the industrial assets and corresponding sensors, the control functions of the industrial assets and sensors, the engineering units associated with one or more industrial assets, the measurement values captured by the industrial assets and sensors, and/or the like. As such, the contextualized asset data can be employed to update, reconfigure, and/or otherwise improve upon an existing digital twin system associated with a particular industrial environment. The contextualized asset data also offers the benefit of allowing one or more end users associated with a corresponding industrial enterprise to make specialized data queries related to the operation, status, and/or configuration of one or more industrial assets in an industrial environment. These specialized queries can be used to generate insight about the industrial assets and therefore be employed to increase the efficiency and/or output of the industrial assets.

Additionally, embodiments of the present disclosure are configured to classify various portions of data depending on the quality of the data as well as the extent to which the data has been contextualized. For example, raw streaming data can be classified as bronze data, contextualized asset data can be classified as silver data, and curated data (e.g., data detailing the context as well as the status of an industrial asset for a predefined period of time) can be classified as gold data. In some embodiments, the classification of a particular portion of data determines where that particular portion of data is stored. For example, in some embodiments, the data contextualization system can store all bronze data (e.g., incoming raw streaming data associated with one or more industrial assets) in a data lake. As another example, in some embodiments, the data contextualization system can store both bronze data and silver data (e.g., contextualized data) in a data lake, and additionally store the silver data in a time series database. In various embodiments, the above mentioned forms of data quality classification are a product of one or more post-processing procedures related to the raw streaming data and the hierarchical reference data associated with an industrial environment.

In various embodiments, the data contextualization system is also configured to determine a change event related to a change and/or reconfiguration of one or more portions of the hierarchical reference data associated with the industrial assets in an industrial environment. Change events related to the hierarchical reference data can come about in various ways. In one non-limiting scenario, various embodiments can present the hierarchical reference data to an end user in an interactive table such that the end user can update and/or reconfigure various data attributes and/or data configurations associated with the hierarchical reference data by manipulating the interactive table. In another non-limiting scenario, various changes can be imparted on a knowledge graph that is associated with the hierarchical reference data. Based on the change event, the data contextualization system is configured to update one or more portions of respective data comprised in the data lake and/or time series database.

In one or more embodiments, a digital twin system associated with a particular industrial environment can be represented as an extensible object model (EOM). In various embodiments, the data contextualization system can automatically detect whether a change event has taken place, for example, by routinely polling the EOM by executing one or more EOM sync jobs on the EOM comprising the hierarchical reference data and/or a respective knowledge graph associated with the industrial assets of a particular industrial environment. In various embodiments, the data contextualization system can be configured to repeatedly poll the EOM on a predefined schedule (e.g., every few seconds, minutes, hours, days, and/or any combination thereof). In various other embodiments, an end user can manually direct the data contextualization system (e.g., by way of a user computing device) to determine whether a change event has taken place. Based on the change event, the data contextualization system is configured to reconfigure the one or more respective flattened asset data objects associated with the one or more portions of hierarchical reference data that has been updated and/or or otherwise changed. In this way, the data contextualization system can accurately contextualize the raw streaming data with the most current configuration of the one or more flattened asset data objects.

In various embodiments, the data contextualization system can cause the rendering of the one or more portions of raw streaming data, the one or more flattened asset data objects, and/or the one or more portions of contextualized asset data. For example, the data contextualization system can cause the rendering of the raw streaming data, flattened asset data objects, and/or contextualized asset data via an electronic interface component of one or more user computing devices. In various embodiments, the data contextualization system can generate an interactive tabular representation of the one or more flattened asset data objects stored in the data lake. Additionally, the data contextualization system can generate an interactive tabular representation of the one or more portions of contextualized asset data stored in the time series database.

As such, by employing one or more techniques disclosed herein, various technical improvements can be achieved. For example, employing the one or more techniques disclosed herein can improve the quality of the various types of industrial data stored in one or more data stores (e.g., a data lake and/or time series database) associated with a particular industrial environment by contextualizing the raw streaming data with one or more flattened asset data objects corresponding to the one or more respective industrial assets producing the raw streaming data. Furthermore, an amount of time for contextualizing raw streaming data generated by one or more industrial assets can be reduced. Moreover, once the raw streaming data has been properly contextualized, specialized data queries can be made on the contextualized asset data. The specialized data queries can additionally or alternatively reduce the usage of various technical resources and offer detailed insight for analyzing the health, function, efficiency, and/or output of the industrial assets in a particular industrial environment.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100. In certain embodiments, the networked computing system environment 100 is an on-premises networked computing system where the edge 115 is configured as a process control network and the cloud 105 is configured as an enterprise network.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the results to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
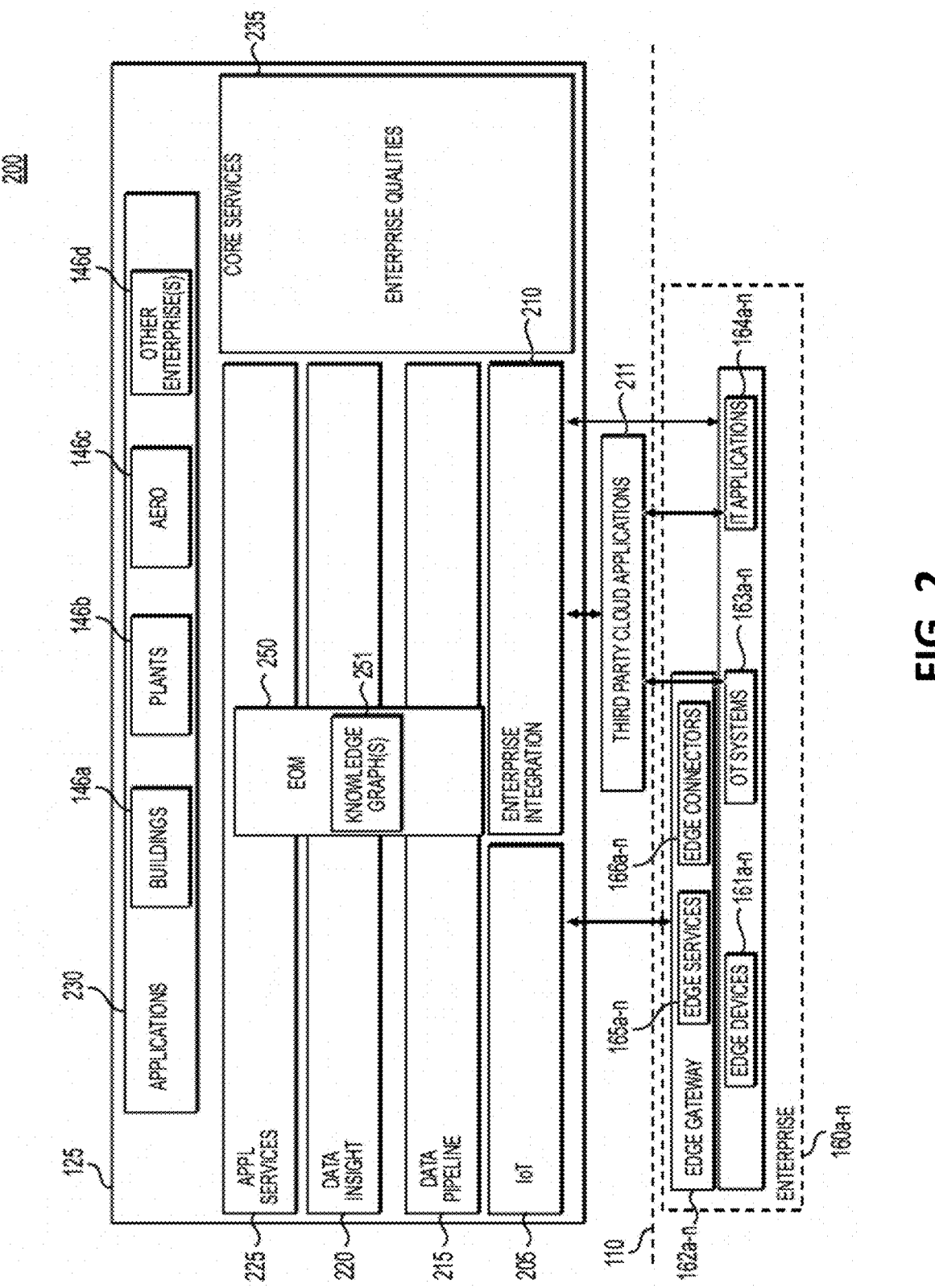
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, air handler units, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 160a-160n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, Wi-Fi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., Wi-Fi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added. In certain embodiments, the framework 200 can be an on-premises framework where the edge devices 161a-161n are configured as part of a process control network and the IoT platform 125 is configured as an enterprise network.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, an "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any applications operated by an enterprise in relation to its edge devices. For example, the enterprise integration layer 210 connects with enterprise databases, such as guest databases, customer databases, financial databases, patient databases, etc. The enterprise integration layer 210 provides a standard API to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly. In certain embodiments, the enterprise integration layer 210 enables a scalable architecture to expand interfaces to multiple systems and/or system configurations. In certain embodiments, the enterprise integration layer 210 enables integration with an indoor navigation system related to the enterprise 160a-160n.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

FIG. 3 illustrates a system 300 that provides an exemplary environment according to one or more described features of one or more embodiments of the disclosure. According to an embodiment, the system 300 includes a data contextualization system 302. The data contextualization system 302 is associated with one or more application products such as data contextualization platform, a data modeling platform, an asset management platform, an asset performance platform, a global operations platform, a site operations platform, an industrial asset platform, an industrial process platform, a digital worker platform, an energy and sustainability platform, a healthy buildings platform, an energy optimization platform, a predictive maintenance platform, a centralized control platform, and/or another type of asset platform. In one or more embodiments, the data contextualization system 302 receives the request 310 from a user computing device 314. In certain embodiments, the data contextualization system 302 receives the request 310 via the network 110. Additionally, in one or more embodiments, the data contextualization system 302 transmits the contextualized asset data 312 to the user computing device 314. In certain embodiments, the data contextualization system 302 transmits the contextualized asset data 312 via the network 110.

In an embodiment, the data contextualization system 302 receives raw streaming data 308 generated, captured, and/or otherwise obtained by the edge devices 161a-161n. In one or more embodiments, at least a portion of the raw streaming data 308 from the edge devices 161a-161n is included in the contextualized asset data 312. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more industrial assets, one or more building assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the data contextualization system 302 via the network 110.

The raw streaming data 308 associated with the edge devices 161a-161n includes, for example, industrial asset data related to one or more industrial processes associated with one or more respective industrial assets (e.g., asset configuration data, operational functionality data, asset properties etc.), asset identification data, sensor identification data, sensor data, site data, real-time data, live property value data, event data, process data, operational data, fault data, and/or other data associated with the edge devices 161a-161n.). In one or more embodiments, the sensor data includes real-time sensor data, live property value data, historical sensor data, and/or other sensor data for one or more industrial assets (e.g., one or more assets associated with a first geographic region for a first asset infrastructure). In one or more embodiments, the site data includes specific site data for an asset infrastructure (e.g., a first asset infrastructure), event data for an asset infrastructure, process data for an asset infrastructure, operational data for an asset infrastructure, fault data for an asset infrastructure, asset infrastructure data for an asset infrastructure, and/or other site data for an asset infrastructure.

Additionally, the raw streaming data 308 includes one or more portions of metadata related to one or more industrial assets. In various embodiments, the one or more portions of metadata can be used to facilitate correlating attributes of the raw streaming data 308 to the contextualized asset data 312 and/or to facilitate formatting one or more portions of the contextualized asset data 312. In one or more embodiments, the one or more portions of metadata include identifying metadata, functional metadata, spatial metadata, asset metadata, algorithm parameters, and/or other metadata. In one or more embodiments, the raw streaming data 308 and/or the contextualized asset data 312 is data that is accessible by a customer identifier based on a set of rules associated the customer identifier.

In certain embodiments, at least one edge device from the edge devices 161a-161n incorporates encryption capabilities to facilitate encryption of one or more portions of the industrial asset data. Additionally, in one or more embodiments, the data contextualization system 302 receives the raw streaming data 308 associated with the edge devices 161a-161n via the network 110. In one or more embodiments, the network 110 is a Wi-Fi network, an NFC network, a WiMAX network, a PAN, a short-range wireless network (e.g., a Bluetooth® network), an infrared wireless (e.g., IrDA) network, a UWB network, an induction wireless transmission network, and/or another type of network. In one or more embodiments, the edge devices 161a-161n are associated with an industrial environment (e.g., an industrial plant, etc.). Additionally or alternatively, in one or more embodiments, the edge devices 161a-161n are associated with components of the edge 115 such as, for example, one or more enterprises 160a-160n.

The system 300 also comprises one or more dynamic data stores such as a data lake 304 and a time series database 306. The data lake 304 and a time series database 306 can be configured to store one or more portions of raw streaming data 308, contextualized asset data 312, industrial asset metadata, and/or enterprise-specific configuration data. In one or more embodiments, the data contextualization system 302 aggregates the raw streaming data 308 associated with the edge devices 161a-161n from the edge devices 161a-161n. For instance, in one or more embodiments, the data contextualization system 302 aggregates the data associated with the edge devices 161a-161n into a data lake 304. The data lake 304 is configured to store one or more portions of raw streaming data 308 generated by the one or more respective edge devices 161a-161n as the raw streaming data 308 is received by the data contextualization system 302.

The time series database 306 is a cache memory (e.g., a database structure) that dynamically stores the contextualized asset data 312 associated with one or more respective flattened asset data objects related to one or more respective edge devices 161a-161n based on intervals of time. In one or more embodiments, the data contextualization system 302 can timestamp one or more portions of the raw streaming data 308 as the raw streaming data 308 is received before contextualizing the raw streaming data 308. In various other embodiments, the data contextualization system 302 can parse timestamp information generated by the one or more edge devices 161a-161n from the raw streaming data 308. As such, in one or more embodiments, the time series database 306 can store the contextualized asset data 312 associated with one or more portions of timestamped sensor data captured by one or more sensor points associated with the one or more respective assets, timestamped calculation data computed by one or more processors associated with the one or more respective assets, and/or timestamped measurement data captured by one or more measurement devices associated with the one or more respective assets.

In one or more embodiments, data associated with the time series database 306 is in communication with a cloud application that is accessible by select number of customers (e.g., industrial enterprises). For example, in one or more embodiments, the cloud application associated with the time series database 306 is a cloud application accessible by customers associated with the edge devices 161a-161n comprised withing a particular industrial environment. In one or more embodiments, the cloud application is a computing service provided by any type or combination of application servers, communication servers, web servers, super-computing servers, database servers, file servers, mail servers, proxy servers, and/or virtual servers. Additionally, in one or more embodiments, the cloud application manages data associated with the time series database 306.

In one or more embodiments, the data contextualization system 302 repeatedly updates data comprised in the data lake 304 based on the raw streaming data 308 provided by the edge devices 161a-161n. For instance, in one or more embodiments, the data contextualization system 302 stores new data and/or modified data associated with the edge devices 161a-161n (e.g., raw streaming data 308 and/or flattened asset data objects associated with one or more industrial assets). In one or more embodiments, the data contextualization system 302 repeatedly scans the edge devices 161a-161n to determine new data and/or changes to hierarchical reference data associated with the edge devices 161a-161n for storage in the data lake 304.

In one or more embodiments, the data contextualization system 302 formats one or more portions of the raw streaming data 308, contextualized asset data 312, and/or asset metadata. For instance, in one or more embodiments, the data contextualization system 302 provides a formatted version of the data associated with the edge devices 161a-161n to the data lake 304. In an embodiment, the formatted version of the industrial asset data is formatted with one or more defined formats associated with the one or more timestamps and/or the one or more flattened asset data objects. A defined format associated with the flattened asset data objects comprised in the contextualized asset data 312 is, for example, data object configured as a string of text where the various data attributes associated with the corresponding industrial assets are appended to the string of text as suffixes separated by a colon. Additionally, one or more portions of raw streaming data 308 and/or contextualized asset data 312 can be configured in an interactive tabular format. Various configurations of flattened asset data objects, raw streaming data 308, contextualized asset data 312 and the other various industrial data described herein will be further detailed in the following sections.

In one or more embodiments, the data contextualization system 302 identifies, groups, and/or otherwise contextualizes data (e.g., raw streaming data 308) associated with the edge devices 161a-161n, thereby generating contextualized asset data 312. In one or more embodiments, the data contextualization system 302 employs batching, concatenation of data associated with the edge devices 161a-161n, identification of data types, merging of data associated with the edge devices 161a-161n, grouping of data associated with the edge devices 161a-161n, reading of data associated with the edge devices 161a-161n, and/or writing of data associated with the edge devices 161a-161n to facilitate storage of data associated with the edge devices 161a-161n within the data lake 304 and/or time series database 306. In one or more embodiments, the data contextualization system 302 groups data associated with the edge devices 161a-161n based on corresponding features and/or attributes of the data. In one or more embodiments, the data contextualization system 302 groups data associated with the edge devices 161a-161n based on corresponding identifiers (e.g., a matching asset hierarchy level, a matching asset, a matching industrial environment, etc.) for the industrial asset data. In one or more embodiments, the data contextualization system 302 employs one or more locality-sensitive hashing techniques to group data associated with the edge devices 161a-161n based on similarity scores and/or calculated distances between different data associated with the edge devices 161a-161n. In one or more embodiments, at least a portion of the data stored in the data lake 304 and the time series database 306 is included in the contextualized asset data 312.

In various embodiments, the data contextualization system 302 can receive the request 310. In various embodiments, the request 310 can be an API call request to trigger one or more APIs. In one or more embodiments, the request 310 is a request to request to poll an extensible object model (EOM) (e.g., EOM 250) comprising hierarchical reference data associated with one or more edge devices 161a-161n associated with an industrial environment by executing one or more EOM sync jobs. In various embodiments, the hierarchical reference data can be comprised in and/or correspond to, a knowledge graph (e.g., knowledge graphs 251) associated with the one or more edge devices 161a-161n comprised in the EOM 250. Additionally, in various embodiments, the EOM 250 can be a representation of a digital twin system related to the industrial environment. In response to the request 310, the data contextualization system 302 can generate one or more flattened asset data objects associated with the one or more respective portions of hierarchical reference data associated with edge devices 161a-161n. The one or more flattened asset data objects are configured to be associated with one or more portions of raw streaming data 308 generated by the one or more respective edge devices 161a-161n.

The request 310 can also be a request to determine one or more change events associated with the hierarchical reference data associated with a particular industrial environment. For example, in response to the request 310, the data contextualization system 302 is configured to determine a change event related to a change and/or reconfiguration of one or more portions of the hierarchical reference data associated with the industrial assets (e.g., edge devices 161a-161n) in an industrial environment. Change events related to the hierarchical reference data can come about in various ways. In one non-limiting scenario, various embodiments can present the hierarchical reference data to an end user in an interactive table such that the end user can update and/or reconfigure various data attributes and/or data configurations associated with the hierarchical reference data by manipulating the interactive table. In another non-limiting scenario, various changes can be imparted on a knowledge graph (e.g., knowledge graphs 251) that is associated with the hierarchical reference data. Based on the change event, the data contextualization system 302 is configured to update one or more portions of respective data comprised in the data lake 304 and/or time series database 306.

In one or more embodiments, the data contextualization system 302 can automatically detect whether a change event has taken place, for example, by routinely polling the EOM (e.g., polling the EOM 250 by executing an EOM sync job) comprising the hierarchical reference data and/or a respective knowledge graph (e.g., knowledge graphs 251) associated with the industrial assets (e.g., edge devices 161a-161n) of a particular industrial environment. In various embodiments, the data contextualization system 302 can be configured to repeatedly poll the EOM on a predefined schedule (e.g., every few seconds, minutes, hours, days, and/or any combination thereof). In various other embodiments, an end user can manually direct the data contextualization system 302 (e.g., by way of a user computing device 314) to determine whether a change event has taken place. Based on the change event, the data contextualization system 302 is configured to reconfigure the one or more respective flattened asset data objects associated with the one or more portions of hierarchical reference data that has been updated and/or or otherwise changed. In this way, the data contextualization system 302 can accurately contextualize the raw streaming data 308 with the most current configuration of the one or more flattened asset data objects.

In one or more embodiments, the user computing device 314 is in communication with the data contextualization system 302 via the network 110. In one or more embodiments, the user computing device 314 is integrated within or corresponds to a mobile computing device, a smartphone, a tablet computer, a mobile computer, a desktop computer, a laptop computer, a workstation computer, a wearable device, a virtual reality device, an augmented reality device, or another type of computing device located remote from the data contextualization system 302. In an embodiment, the user computing device 314 transmits the request 310 to the data contextualization system 302 via the network 110. In another embodiment, the data contextualization system 302 transmits the contextualized asset data 312 to the user computing device 314 via the network 110.

In one or more embodiments, the contextualized asset data 312 includes one or more visual elements for the visual display of the user computing device 314 that renders an interactive user interface based on a respective user interface configuration. For example, the data contextualization system 302 can cause a rendering of visualization data associated with the contextualized asset data 312 and/or the raw streaming data 308. In certain embodiments, the visual display of the user computing device 314 displays one or more graphical elements associated with the contextualized asset data 312. In certain embodiments, the electronic interface component of the user computing device 314 renders one or more interactive display elements associated with the contextualized asset data 312. In certain embodiments, the data contextualization system 302 can configure the electronic interface to render an interactive tabular representation of the contextualized asset data 312 and/or the one or more flattened asset data objects associated with hierarchical reference data comprised in the EOM.

Figure 4:
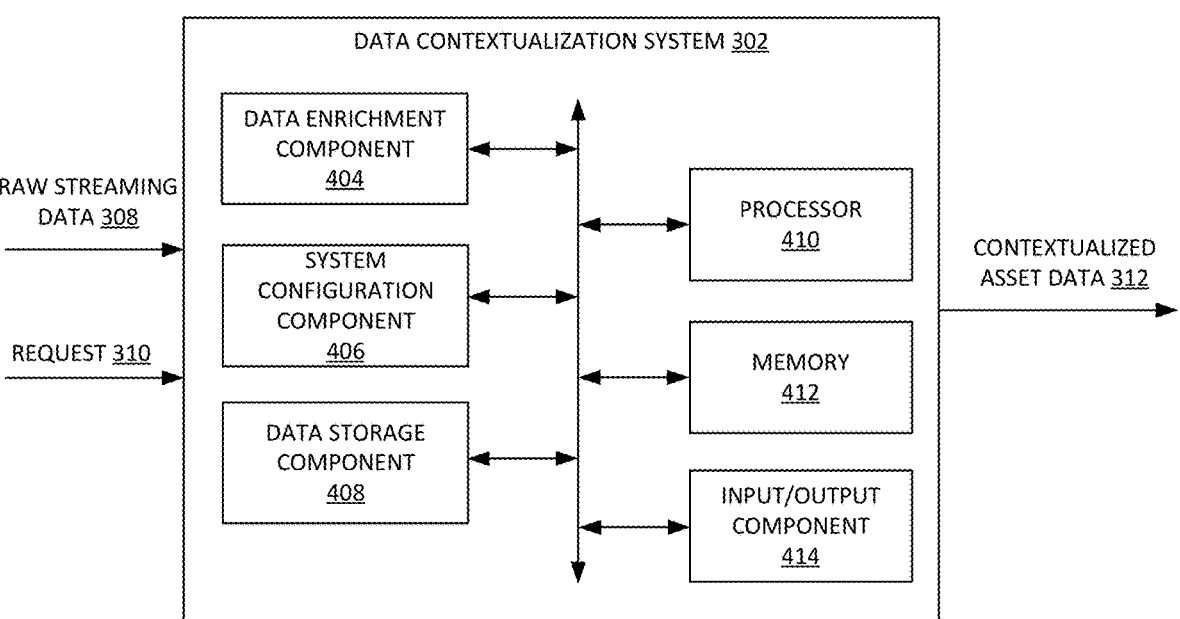
FIG. 4 illustrates an exemplary data contextualization system, in accordance with one or more embodiments described herein.

FIG. 4 illustrates a system 400 that provides an exemplary environment according to one or more described features of one or more embodiments of the disclosure. Specifically, the system 400 details the exemplary data contextualization system 302 (first introduced in FIG. 3) to provide a practical application of contextualizing raw streaming data 308 for one or more industrial assets (e.g., one or more edge devices 161a-161n) in an industrial environment. In various embodiments, the data contextualization system 302 provides a practical application of data analytics technology and/or digital transformation technology to facilitate contextualization of raw streaming data 308 with one or more data attributes associated with one or more respective flattened asset data objects. In one or more embodiments, the data contextualization system 302 provides a practical application of receiving requests (e.g., request 310) to generate contextualized asset data 312 and transmit contextualized asset data 312 comprising visual representations of the raw streaming data 308, contextualized asset data 312, and/or one or more flattened asset data objects associated therewith.

In an embodiment, the data contextualization system 302 works in conjunction with a server system (e.g., a server device such as data lake 304), one or more data sources, and/or one or more assets associated with an industrial environment (e.g., edge devices 161a-161n). In one or more embodiments, the data contextualization system 302 comprises one or more processors and a memory. In one or more embodiments, the data contextualization system 302 interacts with a computer system from the computer systems 120 to facilitate raw streaming data contextualization conventions in accordance with the present disclosure. In one or more embodiments, the data contextualization system 302 interacts with a computer system from the computer systems 120 via the network 110.

The data contextualization system 302 is also related to one or more technologies, such as, for example, enterprise technologies, industrial technologies, connected building technologies, Internet of Things (IoT) technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the data contextualization system 302 provides an improvement to one or more technologies such as enterprise technologies, industrial technologies, connected building technologies, IoT technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the data contextualization system 302 improves performance of a user computing device 314. For example, in one or more embodiments, the data contextualization system 302 improves processing efficiency of a user computing device 314, reduces power consumption of a user computing device 314, improves quality of data provided by a user computing device 314, etc. In various embodiments, the data contextualization system 302 improves performance of a user computing device 314 by optimizing content rendered via an interactive user interface, by reducing a number of user interactions with respect to an interactive user interface, and/or by reducing a number of computing resources required to render content via an interactive user interface.

The data contextualization system 302 includes a data enrichment component 404, a system configuration component 406, and/or a data storage component 408. Additionally, in one or more embodiments, the data contextualization system 302 includes a processor 410, a memory 412, and/or an input/output component 414. In certain embodiments, one or more aspects of the data contextualization system 302 (and/or other systems, apparatuses and/or processes disclosed herein) constitute executable instructions embodied within a computer-readable storage medium (e.g., the memory 412). For instance, in an embodiment, the memory 412 stores computer executable component and/or executable instructions (e.g., program instructions). Furthermore, the processor 410 facilitates execution of the computer executable components and/or the executable instructions (e.g., the program instructions). In an example embodiment, the processor 410 is configured to execute instructions stored in the memory 412 or otherwise accessible to the processor 410.

The processor 410 is a hardware entity (e.g., physically embodied in circuitry) capable of performing operations according to one or more embodiments of the disclosure. Alternatively, in an embodiment where the processor 410 is embodied as an executor of software instructions, the software instructions configure the processor 410 to perform one or more algorithms and/or operations described herein in response to the software instructions being executed. In an embodiment, the processor 410 is a single core processor, a multi-core processor, multiple processors internal to the data contextualization system 302, a remote processor (e.g., a processor implemented on a server), and/or a virtual machine. In certain embodiments, the processor 410 is in communication with the memory 412, the data enrichment component 404, the system configuration component 406, and/or the data storage component 408 via a bus to, for example, facilitate transmission of data among the processor 410, the memory 412, the input/output component 414, the data enrichment component 404, the system configuration component 406, and/or the data storage component 408. The processor 410 may be embodied in a number of different ways and, in certain embodiments, includes one or more processing devices configured to perform independently. Additionally or alternatively, in one or more embodiments, the processor 410 includes one or more processors configured in tandem via a bus to enable independent execution of instructions, pipelining of data, and/or multi-thread execution of instructions.

The memory 412 is non-transitory and includes, for example, one or more volatile memories and/or one or more non-volatile memories. In other words, in one or more embodiments, the memory 412 is an electronic storage device (e.g., a computer-readable storage medium). The memory 412 is configured to store information, data, content, one or more applications, one or more instructions, or the like, to enable data contextualization system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In one or more embodiments, the input/output component 414 is configured to receive a request 310 (e.g., such as from user computing device 314). In various embodiments, the input/output component 414 can relay the request 310 to the data enrichment component 404, the system configuration component 406, and/or the data storage component 408 for processing and/or compiling contextualized asset data 312. Once the contextualized asset data 312 has been compiled (e.g., as by the data enrichment component 404, the system configuration component 406, and/or the data storage component 408), the input/output component 414 can transmit the contextualized asset data 312 to one or more user computing devices 314. In one or more embodiments, the request 310 received by the data contextualization system 302 (e.g., by way of the input/output component 414) can include one or more data attributes that describe a particular physical industrial asset (e.g., a particular edge device 161a-161n). For instance, in one or more embodiments, the request 310 includes one or more data attributes that describe the edge devices 161a-161n in order to update one or more portions of hierarchical reference data associated with the respective edge devices 161a-161n. A data attribute includes, for example, data properties such as an asset identifier, an asset role, an asset manufacturer identifier, a corresponding engineering unit identifier, an asset location, an asset sensor point identifier, an asset sensor type, an asset sensor measurement value, a user identifier, a change event identifier, or a timestamp. Additionally, the one or more data attributes can be associated with one or more respective primitive data types such as, for example, an integer, a string, a floating decimal value, and/or one or more various array types.

In various embodiments, the data enrichment component 404, the system configuration component 406, and the data storage component 408 embody executable computer program code and/or interface with one or more computer programs and/or computer hardware configured to employ data modeling and contextualization conventions to support raw streaming data contextualization for one or more industrial assets related to one or more industrial processes in an industrial environment. In various embodiments, the one or more industrial processes are related to the edge devices 161a-161n. In one or more embodiments, the edge devices 161a-161n are associated with the portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and a data contextualization system 302 via the network 110. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the data enrichment component 404 can receive, normalize, and enrich (e.g., contextualize) the raw streaming data 308 generated by the edge devices 161a-161n. In various embodiments, the data enrichment component 404 comprises a receiver, a normalizer, a streaming enricher, and/or a backfilling enricher. The receiver is configured to intake all raw streaming data 308 generated by the edge devices 161a-161n. In various embodiments, one or more event hubs can be configured to listen for new raw streaming data 308 being generated by the edge devices 161-161n. In various embodiments, the one or more event hubs can be integrated with the edge gateways 162a-162n. In various other embodiments, the event hubs can be embodied by, or integrated with, the edge services 165a-165n. The receiver is also configured to transmit the raw streaming data 308 to the normalizer. Additionally, the receiver is also configured to transmit the raw streaming data 308 to the data lake 304.

The normalizer comprised within the data enrichment component 404 can be configured to assess the quality of the of the raw streaming data 308. For example, the normalizer can determine whether one or more portions of metadata associated with the edge devices 161a-161n are missing and/or corrupt. The normalizer is also configured to transmit the raw streaming data 308 to the streaming enricher.

In one or more embodiments, the streaming enricher contextualizes one or more portions of the raw streaming data 308 based on one or more corresponding flattened asset data objects associated with the edge devices 161a-161n. For instance, the data enrichment component 404 is configured to generate, based at least in part on the asset metadata derived from the hierarchical reference data associated with the edge devices 161a-161n, one or more flattened asset data objects corresponding to the edge devices 161a-161n. As such, the streaming enricher can be configured to contextualize the raw streaming data 308 with the one or more flattened asset data objects in order to generate contextualized asset data 312. In various embodiments, contextualizing the raw streaming data 308 with the one or more flattened asset data objects comprises joining, concatenating, formatting, generating respective data objects, and/or otherwise associating the raw streaming data 308 with the one or more flattened asset data objects in order to create contextualized asset data 312.

In one or more embodiments, the streaming enricher contextualizes data from the raw streaming data 308 based on corresponding data attributes and/or corresponding features of asset metadata associated with one or more respective flattened asset data objects to generate contextualized asset data 312. In one or more embodiments, the streaming enricher contextualizes data from the raw streaming data 308 based on one or more corresponding data attributes associated with the flattened asset data objects such as one or more asset identifiers, asset roles, asset manufacturer identifiers, corresponding engineering unit identifiers, asset locations, asset sensor point identifiers, asset sensor types, asset sensor measurement values, user identifiers, change event identifiers, and/or timestamps. In one or more embodiments, the streaming enricher formats the contextualized asset data 312 based on the one or more corresponding data attributes, one or more user identifiers, one or more change event identifiers and/or or one or more timestamps for storage in the time series database 306.

The streaming enricher is also configured to transmit the contextualized asset data 312, in conjunction with the data storage component 408, to the data lake 304. In various embodiments, the streaming enricher is also configured to transmit the contextualized asset data 312, in conjunction with the data storage component 408, to the time series database 306 via an event queue.

In one or more embodiments, the backfilling enricher re-contextualizes, updates, and/or otherwise configures one or more portions of contextualized asset data 312 that has been previously stored in the data lake 304. In some circumstances, for example, after a change event related to a change and/or reconfiguration of the hierarchical reference data associated with one or more industrial assets has taken place, the defined format of the flattened data objects, the contextualized asset data 312, and/or other industrial asset metadata may have changed. In such circumstances, the format and/or configuration of the contextualized asset data 312 associated with timestamps prior to the change event may no longer be compatible. As such, the backfilling enricher is configured to integrate with the data lake 304 to ensure that any industrial asset data comprised in the data lake 304 is configured to match and/or be compatible with the current defined data formats, data schema, data attribute configurations, and the like associated with a particular industrial environment.

In various embodiments, the system configuration component 406 can, in conjunction with the processor 410, configure, process, store, and/or otherwise modify one or more system configuration parameters, schedules, and/or provisioning procedures associated with a data contextualization system 302 related to a particular industrial enterprise. For example, the system configuration component 406 can update, maintain, and/or process one or more portions of enterprise-specific configuration data. In various embodiments, the enterprise-specific configuration data can include, but is not limited to, data associated with configuration management, job deployment schedules, event queue provisioning, event hub provisioning, data storage provisioning, data source configuration, data sync configuration, window/ watermarking configuration, data enrichment configuration, and/or computation algorithm reference. Additionally, the system configuration component 406 is also configured to generate, configure, and/or process one or more application programming interfaces (APIs) associated with one or more components of the data contextualization system 302.

In one or more embodiments, the data storage component 408 aggregates, stores, configures, routes and/or classifies the raw streaming data 308, contextualized asset data 312, asset metadata, and/or enterprise-specific configuration data associated with the one or more edge devices 161a-161n. For instance, in one or more embodiments, the data storage component 408 aggregates the raw streaming data 308 into the data lake 304. In one or more embodiments, the data storage component 408 routes and stores the contextualized asset data 312 in the time series database 306. In one or more embodiments, the data storage component 408 repeatedly updates data of the data lake 304 and/or the time series database 306 at one or more predetermined intervals. For instance, in one or more embodiments, the data storage component 408 stores new data and/or modified data associated with the one or more the one or more edge devices 161a-161n (e.g., hierarchical reference data).

In one or more embodiments, data associated with the time series database 306 is in communication with a cloud application that is accessible by select number of users associated with the industrial enterprise. For example, in one or more embodiments, the cloud application associated with the time series database 306 is a cloud application accessible by users associated with the edge devices 161a-n. In one or more embodiments, the cloud application is a computing service provided by any type or combination of application servers, communication servers, web servers, super-computing servers, database servers, file servers, mail servers, proxy servers, and/virtual servers. Additionally, in one or more embodiments, the cloud application manages data associated with the time series database 306.

In one or more embodiments, the data storage component 408 identifies and/or groups data types associated with the raw streaming data 308 and/or contextualized asset data 312 based on one or more data attributes, one or more user identifiers associated with the cloud application, one or more change event identifiers associated with hierarchical reference data, and/or one or more sensor identifiers associated with one or more assets. In one or more embodiments, the data storage component 408 employs batching, concatenation of the raw streaming data 308, identification of data types, merging of the raw streaming data 308 and/or contextualized asset data 312, grouping of the raw streaming data 308 and/or contextualized asset data 312, reading of the raw streaming data 308 and/or contextualized asset data 312 and/or writing of the raw streaming data 308 and/or contextualized asset data 312 to facilitate data contextualization for the raw streaming data 308.

In one or more embodiments, the data contextualization system 302 formats one or more portions of the raw streaming data 308 and/or contextualized asset data 312 stored in the data lake 304 and/or time series database 306. For instance, in one or more embodiments, the data contextualization system 302 provides a formatted version of the contextualized asset data 312 for storage in the time series database 306. In an embodiment, a formatted version of the contextualized asset data 312 is formatted with one or more defined formats for the time series database 306. A defined format is, for example, a structure for data fields and/or a structure for data object such as a flattened asset data object. In one embodiment, a defined format is predetermined. For example, in one or more embodiments, a predominant type of structure (e.g., a predominant type of format, predominant type of procurement form, etc.) may be employed as a template for future use. In various embodiments, the data contextualization system 302 configures the raw streaming data 308, the contextualized asset data 312, asset metadata (e.g., data attributes), and/or hierarchical reference data to be displayed in an interactive tabular format such that one or more portions of data associated with the raw streaming data 308, the contextualized asset data 312, asset metadata (e.g., data attributes), and/or hierarchical reference data can be manipulated and/or otherwise updated.

In one or more embodiments, the data contextualization system 302 (e.g., by way of the data enrichment component 404) identifies one or more different data fields in the raw streaming data 308 and/or asset metadata that describe a corresponding attribute. For example, in one or more embodiments, the data contextualization system 302 identifies one or more different data fields in the raw streaming data 308 and/or contextualized asset data 312 that describe a corresponding attribute and/or a corresponding feature. In one or more embodiments, the data contextualization system 302 identifies and/or groups data types associated with the raw streaming data 308 and/or contextualized asset data 312 based on a hierarchical data format and/or a flattened data format. In one or more embodiments, the data contextualization system 302 employs batching, concatenation of data columns, identification of data types, merging of data, reading of data and/or writing of data to facilitate data contextualization associated with the raw streaming data 308.

In one or more embodiments, the data contextualization system 302 performs attribute processing to remove one or more defined characters (e.g., special characters), tokenize one or more strings of characters, remove one or more defined words (e.g., one or more stop words), remove one or more single character tokens, and/or other attributes processing with respect to the raw streaming data 308 and/or contextualized asset data 312. In one or more embodiments, the data storage component 408 groups data from the raw streaming data 308 and/or contextualized asset data 312 based on corresponding attributes of the data. In one or more embodiments, the data contextualization system 302 groups data from the raw streaming data 308 and the contextualized asset data 312 based on corresponding identifiers (e.g., a sensor point identifier, and/or the like) for the data.

In one or more embodiments, the data contextualization system 302 generates one or more attributes associated with one or more defined formats for the format structure. The format structure is, for example, a target format structure (e.g., a flattened data format or an interactive tabular format) for the raw streaming data 308 and/or the contextualized asset data 312. In one or more embodiments, the format structure is a format structure for one or more portions of the time series database 306. In an embodiment, the one or more attributes include one or more data field attributes for the format structure. For example, in an embodiment, the one or more attributes include one or more column name attributes for the format structure. Additionally or alternatively, in an embodiment, the one or more attributes include one or more column value attributes for the format structure. However, it is to be appreciated that the one or more attributes can additionally or alternatively include one or more other types of attributes associated with the format structure.

In certain embodiments, the one or more attributes generated by the data contextualization system 302 include one or more text embeddings for column names associated with an interactive tabular representation of the contextualized asset data 312. For example, in certain embodiments, the one or more attributes generated by the data contextualization system 302 include one or more text embeddings for column names associated with a source column name and/or a target column name for one or more portions of the contextualized asset data 312. Additionally or alternatively, in certain embodiments, the one or more attributes generated by the data contextualization system 302 include one or more text embeddings for column values associated with the format structure. In certain embodiments, the data contextualization system 302 learns one or more vector representations of the one or more text embeddings associated with the column names and/or column values. In one or more embodiments, the attributes include a timestamp attribute associated with the data contextualization system 302, an item name attribute associated with the data contextualization system 302, a value attribute associated with the data contextualization system 302, system attribute associated with the data contextualization system 302, a quality attribute associated with the data contextualization system 302, an asset identifier (e.g., an asset name) associated with the data contextualization system 302, an assembly line identifier associated with the data contextualization system 302, packaging line identifier associated with the data contextualization system 302, a location attribute associated with the data contextualization system 302, a building identifier (e.g., a building name) associated with the data contextualization system 302, a plant identifier (e.g., an industrial plant name, a processing plant name, etc.), a unit of measure attribute associated with the data contextualization system 302, a role attribute associated with the data contextualization system 302, a site attribute associated with the data contextualization system 302, and/or another type of attribute associated with the data contextualization system 302.

In one or more embodiments, the data storage component 408 generates one or more attributes based on one or more classifications determined by the data contextualization system 302 with respect to the raw streaming data 308 and/or the contextualized asset data 312 related to the one or more edge devices 161a-161n. For example, raw streaming data 308 can be classified as bronze data, contextualized asset data 312 can be classified as silver data, and curated data (e.g., data detailing the context as well as the status of an industrial asset for a predefined period of time) can be classified as gold data. In some embodiments, the classification of a particular portion of data determines where that particular portion of data is stored. For example, in some embodiments, the data contextualization system 302 can store all bronze data (e.g., incoming raw streaming data 308 associated with one or more edge devices 161a-161n) in the data lake 304. As another example, in some embodiments, the data contextualization system 302 can store both bronze data and silver data (e.g., contextualized asset data 312) in the data lake 304, and additionally store the silver data in the time series database 306.

Figure 5:
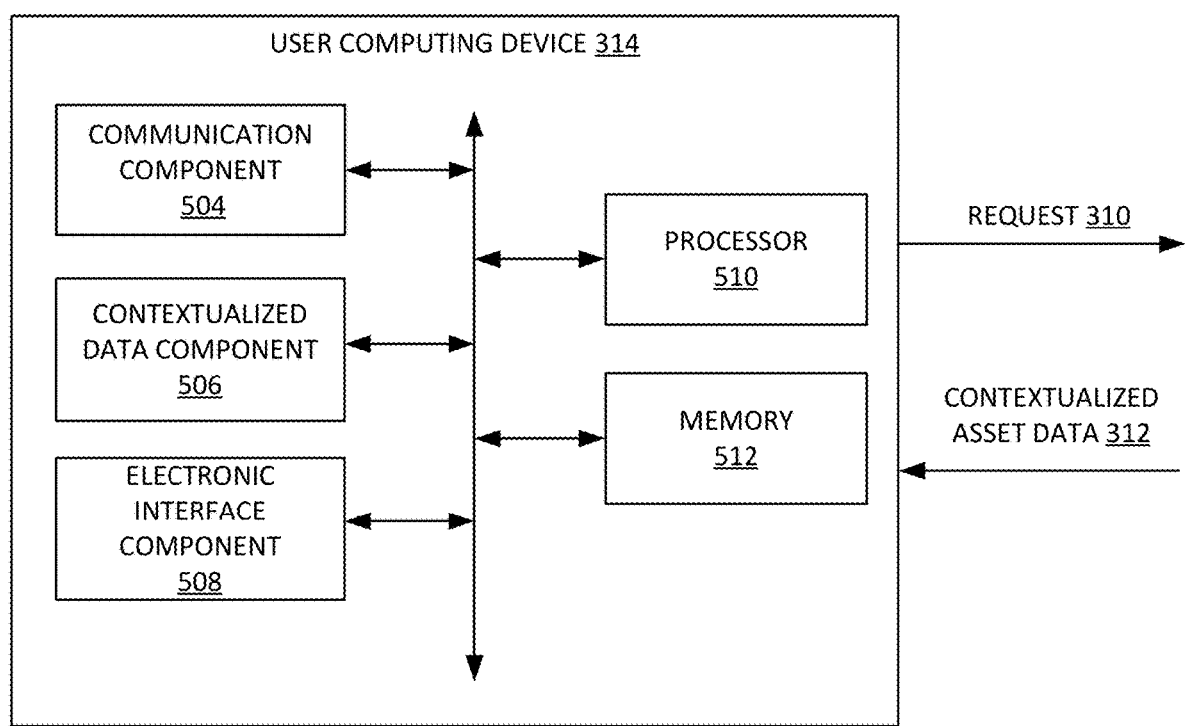
FIG. 5 illustrates an exemplary user computing device, in accordance with one or more embodiments described herein.

FIG. 5 illustrates a system 500 that provides an exemplary environment according to one or more described features of one or more embodiments of the disclosure. According to an embodiment, the system 500 includes a user computing device 314 to provide a practical application of data modeling and inheritance conventions to support streaming data contextualization for one or more industrial assets in an industrial environment. In various embodiments, the user computing device 314 provides a practical application of data analytics technology and/or digital transformation technology to facilitate streaming data contextualization for one or more industrial assets. In one or more embodiments, the user computing device 314 provides a practical application of sending requests to poll the EOM 250 by executing one or more EOM sync jobs, a request to update one or more portions of hierarchical reference data (e.g., data comprised in a knowledge graphs 251), a request to generate one or more flattened asset data objects associated with the one or more respective portions of hierarchical reference data associated with edge devices 161a-161n, a request to determine one or more change events associated with the hierarchical reference data associated with a particular industrial environment, and/or a request to generate one or more portions of contextualized asset data 312.

In an embodiment, the user computing device 314 facilitates interaction with a data contextualization system 302 associated with a server system (e.g., a server device such as data lake 304), one or more data sources, and/or one or more industrial assets associated with an industrial environment (e.g., edge devices 161a-161n). In one or more embodiments, the user computing device 314 is a device with one or more processors and a memory. In one or more embodiments, the user computing device 314 interacts with a computer system from the computer systems 120 to facilitate providing an interactive user interface associated with data modeling and asset entity inheritance conventions. In various embodiments, the interactive user interface is configured via the electronic interface component 508 as a dashboard visualization associated with contextualizing raw streaming data 308 associated with one or more edge devices 161a-161n. In one or more embodiments, the user computing device 314 interacts with a computer system from the computer systems 120 via the network 110.

Moreover, the user computing device 314 provides an improvement to one or more technologies such as enterprise technologies, industrial technologies, connected building technologies, IoT technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the user computing device 314 improves performance of a user computing device. For example, in one or more embodiments, the user computing device 314 improves processing efficiency of a user computing device, reduces power consumption of a computing device, improves quality of data provided by a user computing device, etc. In various embodiments, the user computing device 314 improves performance of a user computing device by optimizing content rendered via an interactive user interface, by reducing a number of user interactions with respect to an interactive user interface, and/or by reducing a number of computing resources required to render content via an interactive user interface.

The user computing device 314 includes a communication component 504, a contextualized data component 506, and/or an electronic interface component 508. Additionally, in one or more embodiments, the user computing device 314 includes a processor 510 and/or a memory 512. In certain embodiments, one or more aspects of the user computing device 314 (and/or other systems, apparatuses and/or processes disclosed herein) constitute executable instructions embodied within a computer-readable storage medium (e.g., the memory 512). For instance, in an embodiment, the memory 512 stores computer executable component and/or executable instructions (e.g., program instructions). Furthermore, the processor 510 facilitates execution of the computer executable components and/or the executable instructions (e.g., the program instructions). In an example embodiment, the processor 510 is configured to execute instructions stored in the memory 512 or otherwise accessible to the processor 510.

The processor 510 is a hardware entity (e.g., physically embodied in circuitry) capable of performing operations according to one or more embodiments of the disclosure. Alternatively, in an embodiment where the processor 510 is embodied as an executor of software instructions, the software instructions configure the processor 510 to perform one or more algorithms and/or operations described herein in response to the software instructions being executed. In an embodiment, the processor 510 is a single core processor, a multi-core processor, multiple processors internal to the user computing device 314, a remote processor (e.g., a processor implemented on a server), and/or a virtual machine. In certain embodiments, the processor 510 is in communication with the memory 512, the communication component 504, the contextualized data component 506 and/or the electronic interface component 508 via a bus to, for example, facilitate transmission of data among the processor 510, the memory 512, the communication component 504, the contextualized data component 506, and/or electronic interface component 508. The processor 510 may be embodied in a number of different ways and, in certain embodiments, includes one or more processing devices configured to perform independently. Additionally or alternatively, in one or more embodiments, the processor 510 includes one or more processors configured in tandem via a bus to enable independent execution of instructions, pipelining of data, and/or multithread execution of instructions.

The memory 512 is non-transitory and includes, for example, one or more volatile memories and/or one or more non-volatile memories. In other words, in one or more embodiments, the memory 512 is an electronic storage device (e.g., a computer-readable storage medium). The memory 512 is configured to store information, data, content, one or more applications, one or more instructions, or the like, to enable the user computing device 314 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In one or more embodiments, the communication component 504 is configured to generate the request 310. In various embodiments, the request 310 is a request to poll an EOM (e.g., EOM 250), a request to update one or more portions of hierarchical reference data (e.g., data comprised in a knowledge graphs 251), a request to generate one or more flattened asset data objects associated with the one or more respective portions of hierarchical reference data associated with edge devices 161a-161n, a request to determine one or more change events associated with the hierarchical reference data associated with a particular industrial environment, and/or a request to generate one or more portions of contextualized asset data 312. In various embodiments, the communication component 504 generates the request 310 in response to an action performed with respect to a user interface configuration for an interactive user interface rendered on a visual display via the electronic interface component 508. The action can be, for example, initiating execution of an application (e.g., a mobile application) via a user computing device that presents the interactive user interface, altering an interactive graphical element via the interactive user interface, or another type of action with respect to the interactive user interface rendered via the electronic interface component 508. Additionally or alternatively, in one or more embodiments, the communication component 504 generates the request 310 in response to execution of a user authentication process via a user computing device. For example, in an embodiment, the user authentication process is associated with password entry, facial recognition, biometric recognition, security key exchange, and/or another security technique associated with a user computing device.

In various embodiments, the interactive user interface is a dashboard visualization related to data modeling and streaming data contextualization conventions to support streaming data contextualization for one or more industrial assets related to one or more industrial processes in an industrial environment. In various embodiments, the one or more industrial processes are related to the edge devices 161a-161n (e.g., the edge devices 161a-161n included in a portfolio of assets). In one or more embodiments, the edge devices 161a-161n are associated with the portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensor points, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and a data contextualization system via the network 110. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the request 310 includes one or more asset descriptors that describe a particular type of one or more physical industrial assets. For instance, in one or more embodiments, the request 310 includes one or more asset descriptors that describe the edge devices 161a-161n in order to generate a digital asset template associated with a particular type of asset comprised in the edge devices 161a-161n. An asset descriptor includes, for example, asset properties such as an asset name, an asset inheritance identifier, an asset level and/or operational functionalities such as the industrial process associated with the asset as well as one or more measurement points the asset is capable of capturing values for.

In an embodiment, the communication component 504 is configured to transmit the request 310. In one or more embodiments, the communication component 504 transmits the request 310 to a server system. For example, in one or more embodiments, the communication component 504 transmits the request 310 to a data contextualization system (e.g., data contextualization system 302). In one or more embodiments, the communication component 504 transmits the request 310 to a computer system from the computer systems 120 to facilitate altering configuration of the interactive user interface. In one or more embodiments, the communication component 504 transmits the request 310 via the network 110.

In one or more embodiments, in response to the request 310, the communication component 504 and/or the contextualized data component 506 is configured to receive contextualized asset data 312. In one or more embodiments, the contextualized data component 506 receives the contextualized asset data 312 from the server system. For example, in one or more embodiments, the contextualized data component 506 receives the contextualized asset data 312 from a data contextualization system (e.g., data contextualization system 302). In one or more embodiments, the contextualized data component 506 receives the contextualized asset data 312 from a computer system from the computer systems 120 to facilitate altering configuration of the interactive user interface based on the contextualized asset data 312. In one or more embodiments, the communication component 504 and/or the contextualized data component 506 receives the contextualized asset data 312 via the network 110. In certain embodiments, the communication component 504 and/or the contextualized data component 506 incorporates encryption capabilities to facilitate encryption and/or decryption of one or more portions of the contextualized asset data 312. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network.

In one or more embodiments, the contextualized data component 506 is configured to render an interactive tabular representation of the contextualized asset data 312 via an interactive user interface (e.g., on the electronic interface component 508). In one or more embodiments, the interactive user interface is configured as a dashboard visualization rendered via a display of a user computing device. In other various embodiments, the interactive user interface is configured as a command-line interface. In one or more embodiments, the contextualized data component 506 renders (e.g., by way of the electronic interface component 508) the interactive tabular representation of the contextualized asset data 312 as respective interactive display elements on the interactive user interface. An interactive display element is a portion of the interactive user interface (e.g., a user-interactive electronic interface portion) that provides interaction with respect to a user of the user computing device. For example, in one or more embodiments, an interactive display element is an interactive display element associated with a set of pixels that allows a user to provide feedback and/or to perform one or more actions with respect to the interactive user interface. In an embodiment, in response to interaction with an interactive display element, the interactive user interface is dynamically altered to display one or more altered portions of the interactive user interface associated with different visual data and/or different interactive display elements.

Additionally, in one or more embodiments, the electronic interface component 508 is configured to facilitate execution and/or initiation of one or more actions via the interactive tabular representation of the contextualized asset data 312. In an embodiment, an action is executed and/or initiated via an interactive display element of the dashboard visualization. For instance, an interaction with the interactive tabular representation of the contextualized asset data 312 can cause execution of an update, modification, deletion, and/or other processing related to the hierarchical reference data, asset metadata, raw streaming data 308, and/or any other data associated with the edge devices 161a-161n. In certain embodiments, the interactive user interface presents one or more notifications associated with the prioritized actions related to the contextualized asset data 312. In certain embodiments, an action related to an interactive display element of the interactive user interface includes an action associated with the application services layer 225, the applications layer 230, and/or the core services layer 235.

Figure 6:
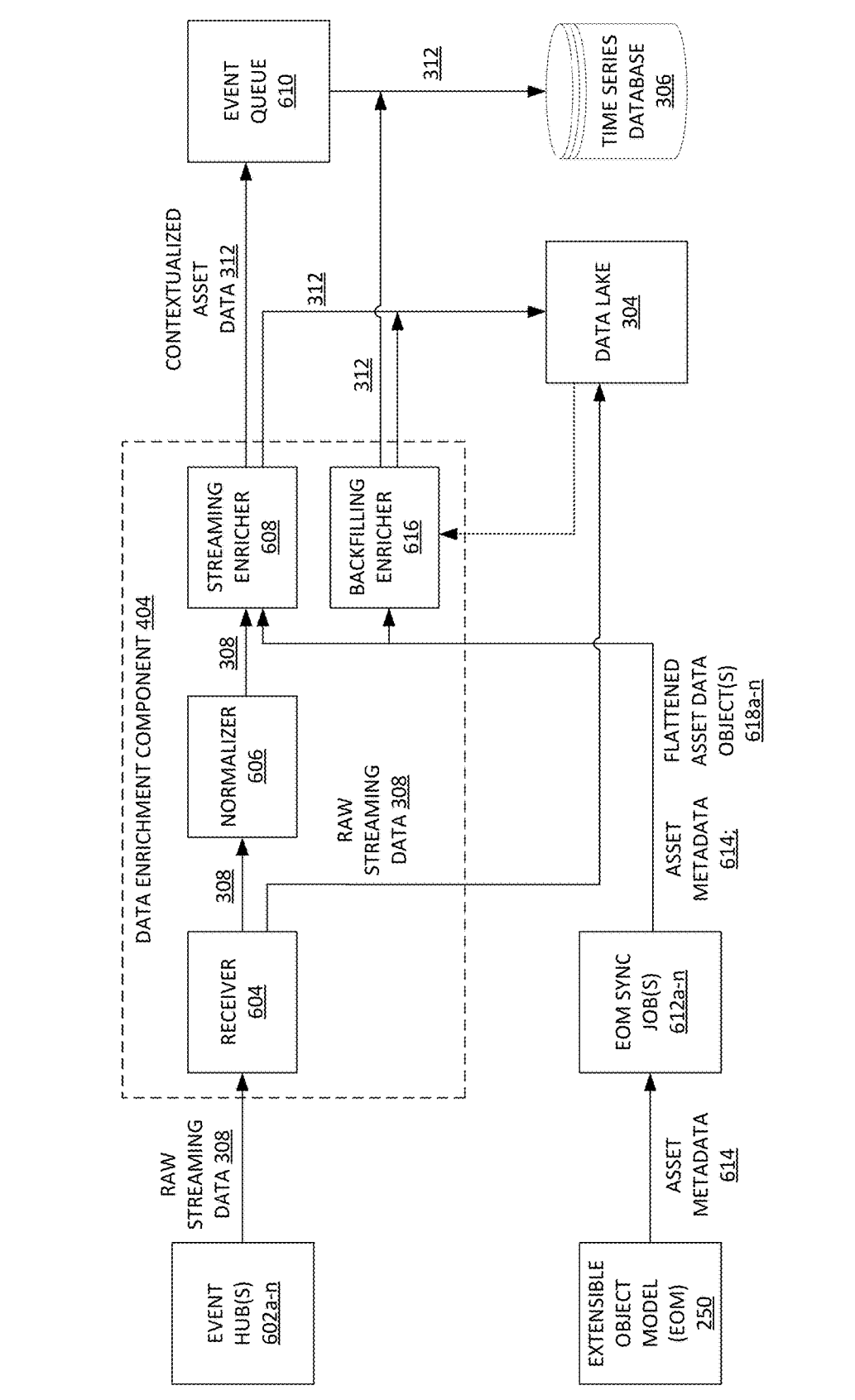
FIG. 6 illustrates an exemplary system for contextualizing streaming data for industrial assets via a data contextualization system, in accordance with one or more embodiments described herein.

FIG. 6 illustrates a system 600 for contextualizing raw streaming data 308 for industrial assets (e.g., edge devices 161a-161n) via a data contextualization system 302, in accordance with one or more embodiments described herein. In an embodiment, the system 600 includes one or more components of the data contextualization system 302 for example, the data enrichment component 404 comprising the receiver 604, the normalizer 606, the streaming enricher 608, and/or the backfilling enricher 616. The system 600 also comprises one or more data stores (e.g., the data lake 304 and the time series database 306), as well as one or more event hubs 602a-602n, and event queue 610, one or more EOM sync jobs 612n-612n, and/or the EOM 250.

In various embodiments, one or more event hubs 602a-602n can be configured to listen for new raw streaming data 308 being generated by the edge devices 161-161n. In various embodiments, the one or more event hubs 602a-602n can be integrated with the edge gateways 162a-162n. In various other embodiments, the event hubs 602a-602n can be embodied by, or integrated with, the edge services 165a-165n. Additionally or alternatively, the one or more event hubs 602a-602n can be cloud-based data listeners configured to ingest raw streaming data 308 via the network 110. In one or more embodiments, the event hubs 602a-602n can be configured to ingest data in real-time (e.g., raw streaming data 308) from one or more data sources simultaneously in parallel, and/or sequentially.

The receiver 604 is configured to intake all raw streaming data 308 generated by the edge devices 161a-161n that has been initially ingested by the one or more event hubs 602a-602n. Additionally, the receiver 604 is also configured to transmit the raw streaming data 308 to the data lake 304. The normalizer 606 comprised within the data enrichment component 404 can be configured to assess the quality of the of the raw streaming data 308. For example, the normalizer 606 can determine whether one or more portions of metadata associated with the edge devices 161a-161n are missing and/or corrupt. The normalizer 606 is also configured to transmit the raw streaming data 308 to the streaming enricher 608.

The streaming enricher 608 is configured to receive one or more portions of asset metadata 614 derived from the EOM 250. Additionally, the streaming enricher 608 is configured to receive one or more flattened asset data objects 618a-618n. In one or more embodiments, the one or more portions of asset metadata 614 are determined during one or more preprocessing steps associated with the EOM 250. For example, the knowledge graphs 251 comprised in the EOM 250 can be traversed to determine the asset metadata 614. In various embodiments, the data contextualization system 302 initializes the EOM sync jobs 612a-6122N which fetch, parse, and map the hierarchical reference data comprising the asset metadata 614 to generate the one or more flattened asset data objects 618a-618n. As such, the one or more flattened asset data objects 618a-618n can comprise respective mappings of one or more data attributes for the hierarchical reference data associated with one or more respective industrial asset(s) (e.g., edge devices 161a-161n) within the industrial environment. In one or more embodiments, the EOM sync jobs 612a-6122N are initialized as the result of one or more knowledge graph API calls executed by the data contextualization system 302. The flattened asset data objects 618a-618n are then persisted in the data lake 304. Once the flattened asset data objects 618a-618n are persisted, the EOM sync jobs 612a-6122N are terminated (as the EOM sync jobs 612a-6122N run in a batch processing mode). The one or more flattened asset data objects 618a-618n comprise one or more data attributes associated with a respective industrial asset (e.g., edge devices 161a-161n) within the industrial environment, and the one or more data attributes can comprise at least one of an asset identifier, an asset role, an asset manufacturer identifier, a corresponding engineering unit identifier, an asset location, an asset sensor point identifier, an asset sensor type, an asset sensor measurement value, a user identifier, a change event identifier, or a timestamp. Additionally, the one or more data attributes can be associated with one or more respective primitive data types.

In various embodiments, the hierarchical reference data is comprised in a knowledge graph 251 associated with the one or more industrial assets within the industrial environment. In order to generate the flattened asset data objects 618a-618n, the data contextualization system 302 is configured to initialize one or more EOM sync jobs 612a-612n to traverse the knowledge graph 251 to parse the hierarchical reference data associated with the one or more respective industrial assets. In various embodiments, traversing the knowledge graph 251 comprises making one or more knowledge graph API calls in a sequentially reactive manner. Various embodiments employ a reactive pagination technique when reading industrial asset and sensor model information from the knowledge graph 251. As there can be hundreds of MBs worth of data, it is common that an API may time out before all the relevant data is read. To avoid these scenarios, the knowledge graph APIs are configured to read knowledge graph data in a reactive, sequential manner such that all the knowledge graph data is completely read before moving to the subsequent steps of the methods described herein.

In one or more embodiments, the streaming enricher 608 contextualizes one or more portions of the raw streaming data 308 based on one or more corresponding flattened asset data objects 618a-618n associated with the edge devices 161a-161n. For instance, the data contextualization system 302 is configured to generate, based at least in part on the results of the one or more EOM sync jobs 612a-612n, one or more flattened asset data objects 618a-618n corresponding to the edge devices 161a-161n. As such, the streaming enricher 608 can be configured to contextualize the raw streaming data 308 with the one or more flattened asset data objects 618a-618n in order to generate contextualized asset data 312. In various embodiments, contextualizing the raw streaming data 308 with the one or more flattened asset data objects 618a-618n comprises joining, concatenating, formatting, generating respective data objects, and/or otherwise associating the raw streaming data 308 with the one or more flattened asset data objects 618a-618n in order to create contextualized asset data 312.

In one or more embodiments, the streaming enricher 608 contextualizes data from the raw streaming data 308 based on corresponding attributes and/or corresponding features of asset metadata 614 associated with one or more respective flattened asset data objects 618a-618n to generate contextualized asset data 312. In one or more embodiments, the streaming enricher 608 contextualizes data from the raw streaming data 308 based on one or more corresponding data attributes (e.g., comprised in asset metadata 614) associated with the flattened asset data objects 618a-618n such as one or more asset identifiers, asset roles, asset manufacturer identifiers, corresponding engineering unit identifiers, asset locations, asset sensor point identifiers, asset sensor types, asset sensor measurement values, user identifiers, change event identifiers, and/or timestamps. In one or more embodiments, the streaming enricher 608 formats data associated with the time series database 306 (e.g., contextualized asset data 312) based on the one or more corresponding data attributes (e.g., comprised in asset metadata 614), one or more user identifiers, one or more change event identifiers, and/or one or more timestamps. The streaming enricher 608 is also configured to transmit the contextualized asset data 312, in conjunction with the data storage component 408, to the data lake 304. In various embodiments, the streaming enricher 608 is also configured to transmit the contextualized asset data 312, in conjunction with the data storage component 408, to the time series database 306 via an event queue 610.

In one or more embodiments, the backfilling enricher 616 re-contextualizes, updates, and/or otherwise reconfigures one or more portions of contextualized asset data 312 that has been previously stored in the data lake 304. In some circumstances, for example, after a change event related to a change and/or reconfiguration of the hierarchical reference data associated with one or more industrial assets has taken place, the defined format of the flattened asset data objects 618a-618n, the contextualized asset data 312, and/or asset metadata 614 may have changed. In such circumstances, the format and/or configuration of the contextualized asset data 312 associated with timestamps prior to the change event may no longer be compatible. As such, the backfilling enricher 616 is configured to integrate with the data lake 304 to ensure that any industrial asset data comprised in the data lake 304 (e.g., contextualized asset data 312) is configured to match and/or be compatible with the current defined data formats, data schema, data attribute configurations, and/or the like associated with a particular industrial environment.

FIG. 7 an exemplary system configuration component 406 of a data contextualization system, in accordance with one or more embodiments described herein. In various embodiments, the system configuration component 406 can, in conjunction with the processor 410, configure, process, store, and/or otherwise modify one or more system configuration parameters, schedules, and/or provisioning procedures associated with a data contextualization system 302 related to a particular industrial enterprise. For example, the system configuration component 406 can update, maintain, and/or process one or more portions of enterprise-specific configuration data 701. In various embodiments, the enterprise-specific configuration data 701 can include, but is not limited to, data associated with configuration management 702, job deployment schedules 704, event queue provisioning 706, event hub provisioning 708, data storage provisioning 710, data source configuration 712, data sync configuration 714, window/watermarking configuration 716, data enrichment configuration 718, and/or computation algorithm reference 720. Additionally, the system configuration component 406 is also configured to generate, configure, and/or process one or more application programming interfaces (APIs) associated with one or more components of the data contextualization system 302. In one or more embodiments, the enterprise-specific configuration data 701 is data accessible by a customer identifier associated with an industrial enterprise based on a set of rules for the customer identifier.

Figure 8:
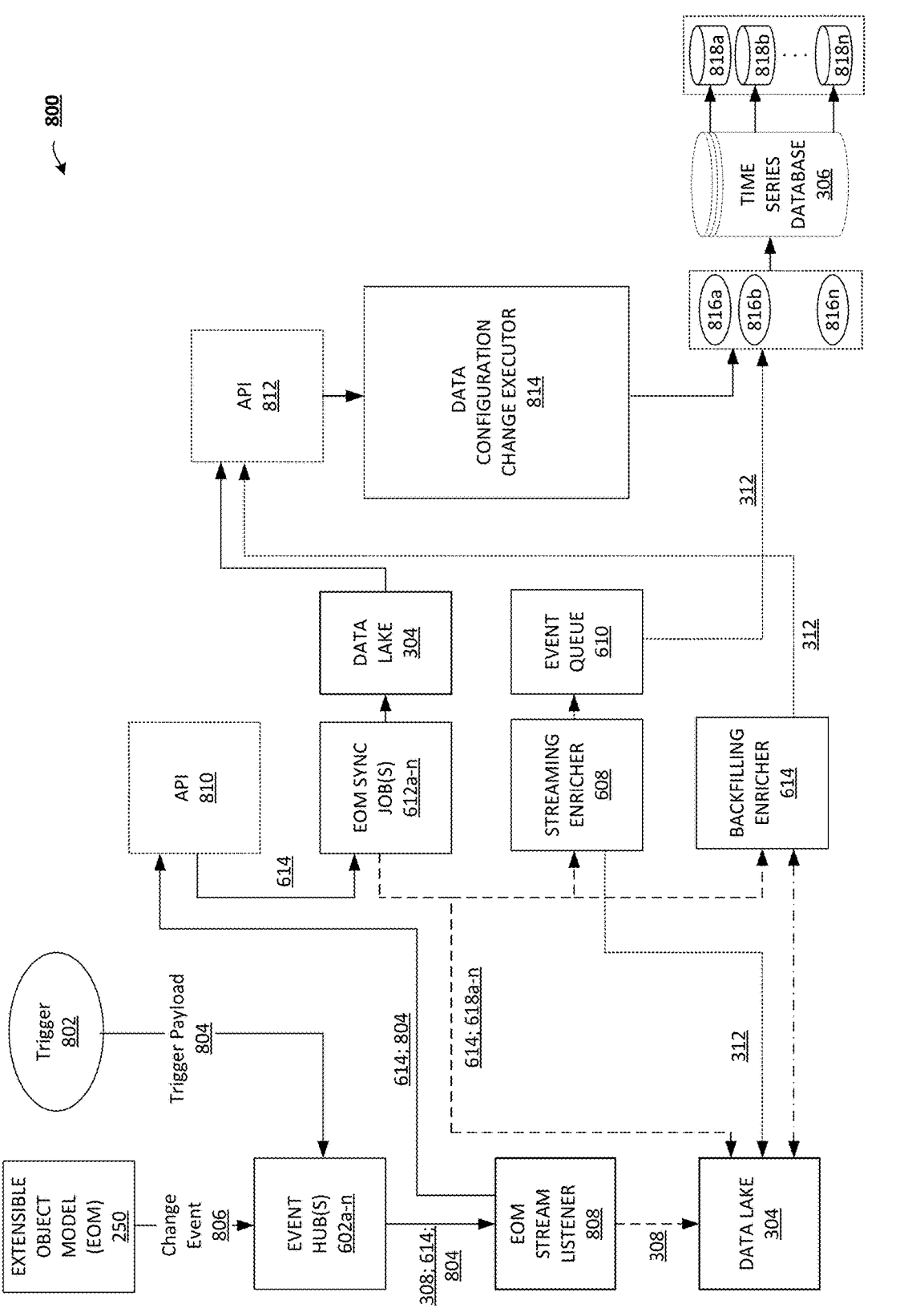
FIG. 8 illustrates an exemplary system for determining change events and updating one or more portions of industrial data based on the change events, in accordance with one or more embodiments described herein.

FIG. 8 illustrates a system 800 for determining change events and updating one or more portions of industrial data based on the change events, in accordance with one or more embodiments described herein. In an embodiment, the system 800 comprises a trigger 802, a trigger payload 804, a change event 806, an EOM stream listener 808, APIs 810-812, a data configuration change executor 814, one or more filters 818a-816B, and one or more datastores 818a-818n. The system 800 also comprises, one or more components of the data contextualization system 302, one or more data stores (e.g., data lake 304 and time series database 306), as well as one or more event hubs 602a-602n and/or an event queue 610.

For example, in various embodiments, the data contextualization system 302 is configured to determine a change event 806 related to a change and/or reconfiguration of one or more portions of the hierarchical reference data associated with one or more edge devices 161a-161n in an industrial environment. A change event 806 related to the hierarchical reference data can come about in various ways.

In one non-limiting scenario, various embodiments can present the hierarchical reference data to an end user in an interactive table such that the end user can update and/or reconfigure various data attributes and/or data configurations associated with the hierarchical reference data by manipulating the interactive table. In another non-limiting scenario, various changes can be imparted on a knowledge graph 251 that is associated with the hierarchical reference data. Based on the change event 806, the data contextualization system 302 is configured to update one or more portions of respective data comprised in the data lake 304 and/or time series database 306.

In one or more embodiments, the data contextualization system 302 can automatically detect whether a change event 806 has taken place, for example, by routinely polling an EOM 250 (e.g., by executing an EOM sync job 612a), where the EOM 250 comprises the hierarchical reference data and/or a respective knowledge graph 251 associated with the industrial assets of a particular industrial environment. In various embodiments, the trigger 802 can initiate the polling of the EOM and can comprise a trigger payload 804 containing a user identifier associated with a particular industrial enterprise. In various embodiments, the data contextualization system 302 can be configured to repeatedly poll the EOM on by activating the trigger 802 on a predefined schedule (e.g., every few seconds, minutes, hours, days, and/or any combination thereof). In various other embodiments, an end user associated with the user identifier associated with the particular industrial enterprise contained in the trigger payload 804 can manually direct the data contextualization system 302 (e.g., by way of a user computing device 314) to determine whether a change event 806 has taken place (e.g., by manually activating the trigger 802).

Based on the change event 806, the data contextualization system 302 is configured to reconfigure the one or more respective flattened asset data objects 618a-618n associated with the one or more portions of hierarchical reference data that has been updated and/or or otherwise changed. In this way, the data contextualization system 302 can accurately contextualize the raw streaming data 308 with the most current configurations (e.g., defined formats) of the one or more flattened asset data objects 618a-618n.

In various embodiments, the one or more event hubs 602a-602n are configured to register and/or otherwise detect the change event 806 and assign the change event 806 a unique change event identifier. The EOM stream listener 808 is configured to intercept one or more portions of data related to the change event 806, the raw streaming data 308, the trigger payload 804, and/or the asset metadata 614 associated with edge devices 161a-161n associated with the knowledge graph 251 comprised in the EOM 250. The EOM stream listener 808 is also configured to transmit the asset metadata 614 and/or user identifier information (e.g., comprised in the trigger payload 804) to the API 810. In various embodiments, the API 810 and the API 812 are configured in part by the system configuration component 406 based on the enterprise-specific configuration data 701. In various other embodiments, the API 810 and the API 812 are configured and/or comprised in the EOM 250. The API 810 and the API 812 can be configured to facilitate one or more operations related to the updating one or more portions of industrial data (e.g., hierarchical reference data) and/or one or more operations related to updating one or more defined data format configurations (e.g., an interactive tabular format) related to the asset metadata 614, the one or more flattened asset data objects 618a-618n, and/or the contextualized asset data 312.

In one or more embodiments, the system 800 includes one or more filters 818a-818n. The one or more filters 818a-818n can be configured to filter data per user identifier (e.g., related to a particular industrial enterprise) to provide respective updates to one or more defined formats associated with the hierarchical reference data associated with the asset metadata 614, flattened asset data objects 618a-618n, and/or contextualized asset data 312 for respective user identifiers to a time series database 306. For example, in one or more embodiments, the one or more filters 818a-818n are configured as respective data dimensionality filters associated with a user identifier. In one or more embodiments, the one or more filters 818a-818n are configured based on respective dimensionality information such as, for example, columns, rows, and/or data attributes associated with a format structure (e.g., an interactive tabular format associated with the contextualized asset data 312). In one or more embodiments, the time series database 306 includes respective datastores 818a-818n for the respective user identifiers to allocate the respective hierarchical reference data associated with the asset metadata 614, flattened asset data objects 618a-618n, and/or contextualized asset data 312 for the respective user identifiers within the respective datastores 818a-818n. In certain embodiments, the respective datastores 818a-818n can be additionally or alternatively configured to receive hierarchical reference data associated with the asset metadata 614, flattened asset data objects 618a-618n, and/or contextualized asset data 312 related to a respective change event 806 associated with one or more industrial assets to update the respective defined data format associated with the contextualized asset data 312 for the respective change event 806. For example, the one or more filters 818a-818n can be additionally or alternatively configured to filter data per change event identifier associated with a particular change event 806.

In one or more embodiments, the data configuration change executor 814 configures the hierarchical reference data associated with the asset metadata 614, flattened asset data objects 618a-618n, the contextualized asset data 312 and/or the one or more filters 818a-818n based on change event 806. In one or more embodiments, dimensionality information for respective user identifiers, respective change event identifiers, and/or one or more data attributes associated with the hierarchical reference data associated with the asset metadata 614, flattened asset data objects 618a-618n, and/or the contextualized asset data 312 is provided to the one or more filters 818a-818n via the data configuration change executor 814 by way of the API 812. In one or more embodiments, the dimensionality information includes one or more dimensions for the one or more filters 818a-818n. In one or more embodiments the dimensionality information includes column information, row information, and/or data attributes associated with a defined format structure for the respective datastores 818a-818n to facilitate configuration of the one or more filters 818a-818n. Additionally, in one or more embodiments, a backfilling enricher 616 is configured to further enrich the asset metadata 614, flattened asset data objects 618a-618n, and/or the contextualized asset data 312 in response to a change event 806 associated with a user identifier (e.g., comprised in the trigger payload 804), a change event identifier, and/or other portions of the system 800.

FIG. 9 illustrates a process flow diagram for contextualizing streaming data for industrial assets, in accordance with one or more embodiments described herein. Specifically, FIG. 9 illustrates a method 900 for contextualizing raw streaming data 308 associated with one or more respective edge devices 161a-161n. In one or more embodiments, the method 900 is associated with the data contextualization system 302. Additionally or alternatively, in various embodiments, the method 900 is associated with the user computing device 314 in conjunction with the data contextualization system 302. In one or more embodiments, the method 900 begins at block 902 that receives a request 310 configured as an API call request to map one or more portions of hierarchical reference data comprised in a digital twin system that digitally represents one or more assets within an industrial environment. In various embodiments, the request 310 can be an API call request to initiate one or more EOM sync jobs 612a-612n. In various embodiments, the request 310 can be generated manually (e.g., by an interaction with the user computing device 314). In various other embodiments, the request 310 can be generated on a predefined schedule. Additionally, in some embodiments, the request 310 can be a request to poll the EOM 250 for change events related to the hierarchical reference data.

For example, in various embodiments, the data contextualization system 302 can be configured to repeatedly poll the EOM 250 based on a predefined schedule (e.g., every few seconds, minutes, hours, days, and/or any combination thereof). In various other embodiments, an end user can manually direct the data contextualization system 302 (e.g., by way of a user computing device 314) to determine whether a change event has taken place. Based on the change event, the data contextualization system 302 is configured to reconfigure the one or more respective flattened asset data objects associated with the one or more portions of hierarchical reference data that has been updated and/or or otherwise changed. In this way, the data contextualization system 302 can accurately contextualize the raw streaming data 308 with the most current configuration of the one or more flattened asset data objects.

The method 900 also includes a step 904 in which the data contextualization system 302 determines if the API call request is processed. If yes, the method 900 proceeds to block 906 where, in response to the API call request, the data contextualization system 302 generates one or more flattened asset data objects 618a-618n associated with the one or more portions of the hierarchical reference data, where the one or more flattened asset data objects 618a-618n comprise respective mappings of one or more data attributes for the one or more portions of the hierarchical reference data. In various embodiments, the hierarchical reference data is comprised in a knowledge graph 251 associated with the one or more industrial assets within the industrial environment. In order to generate the flattened asset data objects 618a-618n, the data contextualization system 302 is configured to initialize one or more EOM sync jobs 612a-612n to traverse the knowledge graph 251 to parse the hierarchical reference data associated with the one or more respective industrial assets. In various embodiments, traversing the knowledge graph 251 comprises making one or more knowledge graph API calls in a sequentially reactive manner. The one or more flattened asset data objects 618a-618n comprise one or more data attributes associated with a respective industrial asset (e.g., edge devices 161a-161n) within the industrial environment, and the one or more data attributes can comprise at least one of an asset identifier, an asset role, an asset manufacturer identifier, a corresponding engineering unit identifier, an asset location, an asset sensor point identifier, an asset sensor type, an asset sensor measurement value, a user identifier, a change event identifier, or a timestamp. Additionally, the one or more data attributes can be associated with one or more respective primitive data types and/or one or more respective array formats.

The method 900 also includes a step 908 in which the data contextualization system 302 correlates one or more portions of raw streaming data (e.g., raw streaming data 308) related to the one or more assets (e.g., edge devices 161a-161n) with at least one flattened asset data object of the one or more flattened asset data objects (e.g., flattened asset data objects 618a-618n) to generate contextualized asset data (e.g., contextualized asset data 312) for the one or more assets. In various embodiments, contextualizing (e.g., correlating) the raw streaming data 308 with the one or more flattened asset data objects 618a-618n comprises joining, concatenating, classifying, organizing, formatting, generating respective data objects, and/or otherwise associating the raw streaming data 308 with the one or more flattened asset data objects 618a-618n in order to create contextualized asset data 312.

In one or more embodiments, the streaming enricher 608 of the data enrichment component 404 contextualizes data from the raw streaming data 308 based on corresponding data attributes and/or corresponding features of asset metadata 614 associated with one or more respective flattened asset data objects 618a-618n to generate contextualized asset data 312. In one or more embodiments, the streaming enricher 608 contextualizes data from the raw streaming data 308 based on one or more corresponding data attributes associated with the flattened asset data objects 618a-618n such as one or more asset identifiers, asset roles, asset manufacturer identifiers, corresponding engineering unit identifiers, asset locations, asset sensor point identifiers, asset sensor types, asset sensor measurement values, user identifiers, change event identifiers, and/or timestamps. In one or more embodiments, the streaming enricher 608 formats the contextualized asset data 312 based on the one or more corresponding data attributes, one or more user identifiers, one or more change event identifiers and/or or one or more timestamps for storage in the time series database 306.

The method 900 also includes a step 910 in which the data contextualization system 302 updates, based on the contextualized asset data, the digital twin system to facilitate one or more asset data queries for the one or more assets via the digital twin system. For example, contextualized asset data 312 can be used to iteratively update a respective digital twin system corresponding to a particular industrial environment in order to monitor, diagnose, troubleshoot, update and/or otherwise improve upon a current configuration of the one or more industrial assets (e.g., edge devices 161a-161n) represented by the digital twin system. The contextualized asset data 312 can be employed to update, reconfigure, and/or otherwise improve upon an existing digital twin system associated with a particular industrial environment. In various embodiments, the digital twin system of a particular industrial environment is represented by a corresponding EOM 205 and, as such, and update, change, and/or reconfiguration of the EOM 250 can result in a respective update, change, and/or reconfiguration of the digital twin system. The contextualized asset data 312 also offers the benefit of allowing one or more end users associated with a corresponding industrial enterprise to make specialized data queries related to the operation, status, and/or configuration of one or more industrial assets (e.g., edge devices 161a-161n) in an industrial environment. These specialized queries can be used to generate insight about the industrial assets and therefore be employed to increase the efficiency and/or output of the industrial assets.

FIGS. 10A-10D illustrate exemplary portions of hierarchical reference data 1000, in accordance with one or more embodiments described herein. In various embodiments, hierarchical reference data 1000 is an exemplary representation of one or more portions of hierarchical reference data associated with one or more edge devices 161a-161n comprised in a knowledge graph 251 related to an EOM 250 associated with a particular industrial enterprise. The hierarchical reference data 1000 can be structured and/or organized into electronically managed data objects associated with various components, sensor data, and/or data attributes associated with the one or more edge devices 161a-161n. The hierarchical reference data 1000 is configured to be fetched, parsed, and/or otherwise process by the data contextualization system 302 for generating one or more flattened asset data objects 618a-618n associated with the respective edge devices 161a-161n. Additionally, the hierarchical reference data 1000 is configured to be represented in an interactive tabular format such that a user computing device 314 associated with a user identifier can update one or more portions of the hierarchical reference data 1000 and/or the format related to the hierarchical reference data 1000. In some embodiments, updating the one or more portions of the hierarchical reference data 1000 causes an updating of the corresponding knowledge graph 251 comprised in the EOM 250 associated with the particular industrial enterprise.

FIGS. 11A-11B illustrate exemplary flattened asset data objects 618a-618n, in accordance with one or more embodiments described herein. In order to generate the flattened asset data objects, the data contextualization system is configured to flatten, or de-normalize, the hierarchical reference data 1000. In order to generate the flattened asset data objects 618a-618n, the data contextualization system 302 is configured to flatten, or de-normalize, the hierarchical reference data 1000 prior to performing the remainder of the exemplary methods associated with the various embodiments described herein. Various industrial asset data, sensor data, and/or one or more data attributes associated with the edge devices 161a-161n comprised in the hierarchical reference data is parsed by starting from the root node of the knowledge graph 251 corresponding to the hierarchical reference data 1000 and traversing down to each child node until the child node is of a primitive datatype or an array. All of the parsed nodes can be mapped and labeled along with the corresponding parent nodes. In this way, flattened asset data objects 618a-618n can be generated and configured to contain various respective data attributes associated with the parsed, mapped, and labeled nodes of the of the knowledge graph 251 associated with the edge devices 161a-161n within the industrial environment. As shown in FIGS. 11A-11B, the flattened asset data objects 618a-618n can be configured as a string of text where the various data attributes associated with the corresponding edge devices 161a-161n are appended to the string of text as suffixes separated by a colon. Once generated, that data contextualization system 302 can store the one or more flattened asset data objects 618a-618n in the data lake 304.

Figure 12:
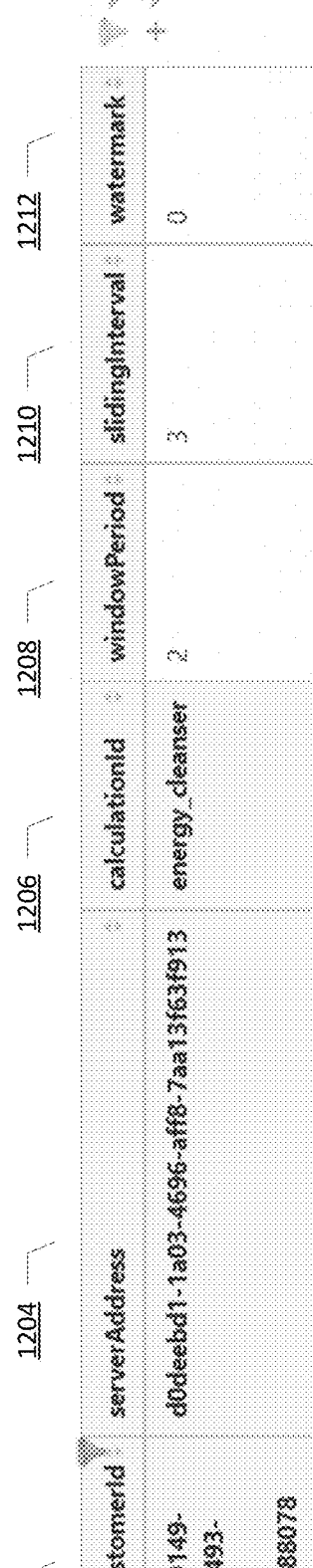
FIG. 12 illustrates an exemplary calculation window definition, in accordance with one or more embodiments described herein.

FIG. 12 illustrates a calculation window definition 1200, in accordance with one or more embodiments described herein. The calculation window definition 1200 is an exemplary embodiment of how the data contextualization system 302 can format one or more portions of industrial asset data (e.g., raw streaming data 308, contextualized asset data 312, flattened asset data objects 618a-618n, asset metadata 614, and/or the like) associated with an industrial environment in an interactive tabular format. As such, one or more portions of the industrial data can be updated and/or reconfigured by a user computing device 314 associated with a user identifier related to the industrial environment. The calculation window definition 1200 comprises a user identifier 1202, a server address 1204, an asset identifier 1206, a window period 1208, a sliding interval 1210, and a watermark 1212.

FIGS. 13A-13D illustrate an exemplary time series database representation 1300 of contextualized asset data, in accordance with one or more embodiments described herein. As described herein, one or more portions of contextualized asset data (e.g., contextualized asset data 312) can be configured in an interactive tabular format and stored in a time series database 306. FIGS. 13A-13D depict how multiple flattened asset data objects (e.g., flattened asset data objects 618a-618n) can be used to contextualize raw streaming data (e.g., raw streaming data 308). For example, row 1302 of the time series database representation 1300 of contextualized asset data depicts a plurality of flattened asset data objects (e.g., flattened asset data objects 618a-618n). As depicted, the flattened asset data objects in row 1302 are associated with one or more asset identifiers, asset roles, asset manufacturer identifiers, corresponding engineering unit identifiers, asset locations, asset sensor point identifiers, asset sensor types, asset sensor measurement values, user identifiers, change event identifiers, and/or timestamps. Rows 1304 and 1306 represent raw streaming data (e.g., raw streaming data 308) associated with two respective industrial assets (e.g., edge devices 161a-161n). As depicted, the respective portions of the raw streaming data associated with the industrial assets detailed in rows 1304 and 1306 have been associated with (e.g., contextualized by) corresponding flattened asset data objects labeled in row 1302. As such, the contextualized data (e.g., contextualized asset data 312) detailed in the time series database representation 1300 can now be effectively queried by specialized data queries executed by one or more computing devices (e.g., one or more user computing devices 314). Additionally, the contextualized data detailed in the time series database representation 1300 can be used to update a digital twin system (and/or a corresponding EOM 250) related to the industrial assets associated with rows 1304 and 1306.

Figure 14:
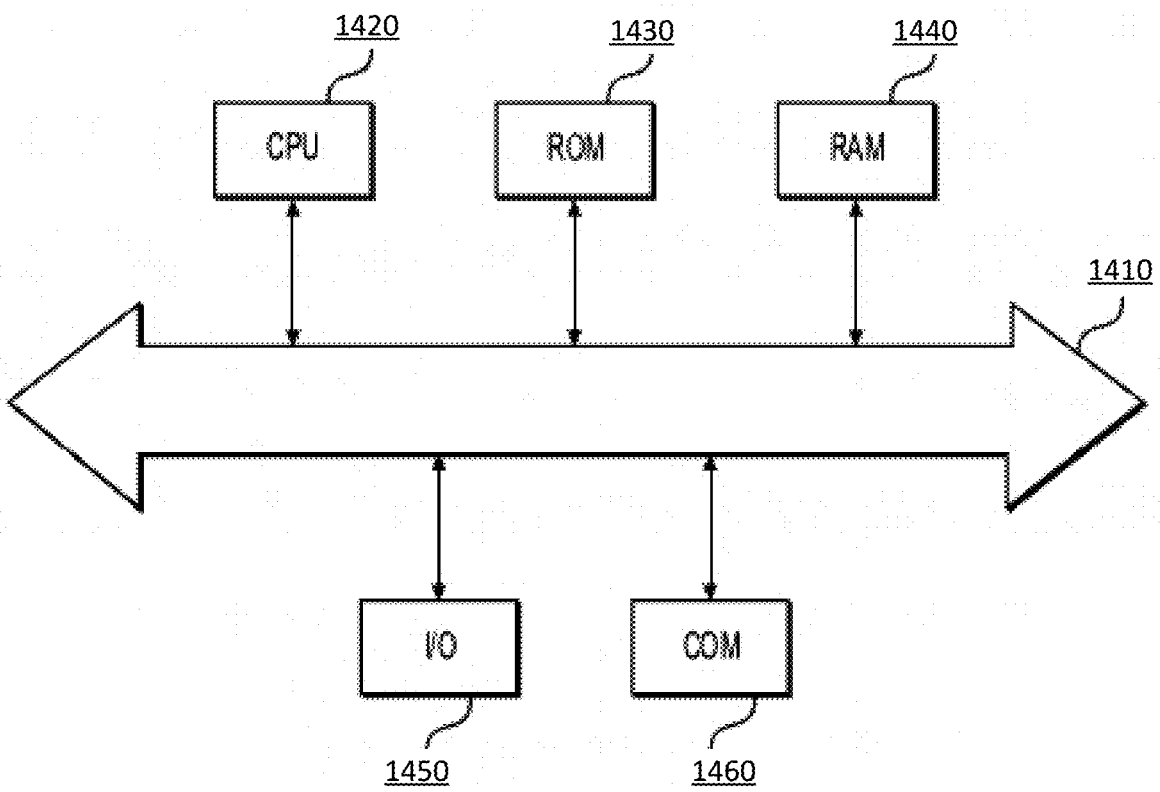
FIG. 14 illustrates a functional block diagram of a computer that may be configured to execute techniques described in accordance with one or more embodiments described herein.

FIG. 14 depicts an example system 1400 that may execute techniques presented herein. FIG. 14 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1460 for packet data communication. The platform also may include a central processing unit ("CPU") 1420, in the form of one or more processors, for executing program instructions. The platform may include an internal communication bus 1410, and the platform also may include a program storage and/or a data storage for various data files to be processed and/or communicated by the platform such as ROM 1430 and RAM 1440, although the system 1400 may receive programming and data via network communications. The system 1400 also may include input and output ports 1450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic waves, a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
receive an application programming interface (API) call request to map one or more portions of hierarchical reference data comprised in a digital twin system that digitally represents one or more assets within an industrial environment;
in response to the API call request, generate one or more flattened asset data objects associated with the one or more portions of the hierarchical reference data, wherein the one or more flattened asset data objects comprise respective mappings of one or more data attributes for the one or more portions of the hierarchical reference data;
correlate one or more portions of raw streaming data related to the one or more assets with at least one flattened asset data object of the one or more flattened asset data objects to generate contextualized asset data for the one or more assets, wherein at least one portion of the one or more portions of raw streaming data comprises identifier data associated with one or more component parts of the one or more respective assets, sensor data captured by one or more sensor points associated with the one or more respective assets, calculation data computed by one or more processors associated with the one or more respective assets, or measurement data captured by one or more measurement devices associated with the one or more respective assets;
join the one or more portions of raw streaming data with the at least one of the one or more flattened asset data objects; and
update, based on the contextualized asset data, the digital twin system to facilitate one or more asset data queries for the one or more assets via the digital twin system.

2. The system of claim 1, wherein the one or more portions of the hierarchical reference data comprised in the digital twin system are structured in a knowledge graph associated with the one or more assets within the industrial environment.

3. The system of claim 2, wherein the one or more programs comprising the instructions configured to generate the one or more flattened asset data objects associated with the one or more respective portions of the hierarchical reference data are further configured to:
traverse one or more data nodes associated with the knowledge graph to parse the one or more portions of the hierarchical reference data associated with the one or more respective assets, wherein traversing the knowledge graph comprises sequentially executing one or more knowledge graph API calls.

4. The system of claim 2, wherein the one or more data attributes are associated with respective parsed nodes of the knowledge graph.

5. The system of claim 1, wherein the one or more data attributes comprised by the one or more flattened asset data objects related to the one or more assets comprise at least one of:
an asset identifier, an asset role, an asset manufacturer identifier, a corresponding engineering unit identifier, an asset location, an asset sensor point identifier, an asset sensor type, an asset sensor measurement value, a user identifier, a change event identifier, or a time-stamp.

6. The system of claim 1, wherein the one or more programs further comprise instructions configured to:

identify a change event with respect to the hierarchical reference data, wherein the change event is associated with an alteration to the one or more portions of the hierarchical reference data associated with the one or more respective assets; and reconfigure, based on the change event, the one or more respective flattened asset data objects associated with the one or more portions of the hierarchical reference data.

7. The system of claim 1, wherein the instructions configured to correlate the one or more portions of raw streaming data related to the one or more assets with the at least one flattened asset data object of the one or more flattened asset data objects to generate the contextualized asset data are further configured to:

join the one or more portions of raw streaming data with the at least one of the one or more flattened asset data objects.

8. The system of claim 1, wherein the one or more portions of raw streaming data are associated with one or more respective industrial processes executed at least in part by the one or more assets.

9. The system of claim 1, wherein the one or more programs further comprise instructions configured to:

cause storage of the one or more portions of raw streaming data related to the one or more assets in a database configured as a data lake.

10. A computer-implemented method, the computer-implemented method comprising:

receiving an application programming interface (API) call request to map one or more portions of hierarchical reference data comprised in a digital twin system that digitally represents one or more assets within an indus-trial environment;

in response to the API call request, generating one or more flattened asset data objects associated with the one or more portions of the hierarchical reference data, wherein the one or more flattened asset data objects comprise respective mappings of one or more data attributes for the one or more portions of the hierar-chical reference data;

correlating one or more portions of raw streaming data related to the one or more assets with at least one flattened asset data object of the one or more flattened asset data objects to generate contextualized asset data for the one or more assets, wherein at least one portion of the one or more portions of raw streaming data comprises identifier data associated with one or more component parts of the one or more respective assets, sensor data captured by one or more sensor points associated with the one or more respective assets, calculation data computed by one or more processors associated with the one or more respective assets, or measurement data captured by one or more measure-ment devices associated with the one or more respec-tive assets;

joining the one or more portions of raw streaming data with the at least one of the one or more flattened asset data objects; and updating, based on the contextualized asset data, the digital twin system to facilitate one or more asset data queries for the one or more assets via the digital twin system.

11. The system of claim 1, wherein the one or more programs further comprise instructions configured to:

generate an interactive tabular representation of the con-textualized asset data for rendering via a graphical user interface.

12. A computer-implemented method, the computer-implemented method comprising:

receiving an application programming interface (API) call request to map one or more portions of hierarchical reference data comprised in a digital twin system that digitally represents one or more assets within an indus-trial environment;

in response to the API call request, generating one or more flattened asset data objects associated with the one or more portions of the hierarchical reference data, wherein the one or more flattened asset data objects comprise respective mappings of one or more data attributes for the one or more portions of the hierar-chical reference data;

correlating one or more portions of raw streaming data related to the one or more assets with at least one flattened asset data object of the one or more flattened asset data objects to generate contextualized asset data for the one or more assets; and updating, based on the contextualized asset data, the digital twin system to facilitate one or more asset data queries for the one or more assets via the digital twin system.

13. The computer-implemented method of claim 12, wherein the one or more portions of the hierarchical refer-ence data comprised in the digital twin system are structured in a knowledge graph associated with the one or more assets within the industrial environment.

14. The computer-implemented method of claim 13, wherein generating the one or more flattened asset data objects associated with the one or more respective portions of the hierarchical reference data further comprises:

traversing one or more data nodes associated with the knowledge graph to parse the one or more portions of the hierarchical reference data associated with the one or more respective assets, wherein traversing the knowledge graph comprises sequentially executing one or more knowledge graph API calls.

15. The computer-implemented method of claim 13, wherein the one or more data attributes are associated with respective parsed nodes of the knowledge graph.

16. A computer program product comprising at least one computer-readable storage medium having program instruc-tions embodied thereon, the program instructions executable by a processor to cause the processor to:

receive an application programming interface (API) call request to map one or more portions of hierarchical reference data comprised in a digital twin system that digitally represents one or more assets within an indus-trial environment;

in response to the API call request, generate one or more flattened asset data objects associated with the one or more portions of the hierarchical reference data, wherein the one or more flattened asset data objects comprise respective mappings of one or more data attributes for the one or more portions of the hierar-chical reference data;

correlate one or more portions of raw streaming data related to the one or more assets with at least one flattened asset data object of the one or more flattened asset data objects to generate contextualized asset data for the one or more assets, wherein at least one portion of the one or more portions of raw streaming data comprises identifier data associated with one or more component parts of the one or more respective assets, sensor data captured by one or more sensor points associated with the one or more respective assets, calculation data computed by one or more processors associated with the one or more respective assets, or measurement data captured by one or more measurement devices associated with the one or more respective assets;

join the one or more portions of raw streaming data with the at least one of the one or more flattened asset data objects; and update, based on the contextualized asset data, the digital twin system to facilitate one or more asset data queries for the one or more assets via the digital twin system.

17. The computer-implemented method of claim 12, wherein the computer-implemented method further comprises:

identifying a change event with respect to the hierarchical reference data, wherein the change event is associated with an alteration to the one or more portions of the hierarchical reference data associated with the one or more respective assets; and reconfiguring based on the change event, the one or more respective flattened asset data objects associated with the one or more portions of the hierarchical reference data.

18. A computer program product comprising at least one computer-readable storage medium having program instructions embodied thereon, the program instructions executable by a processor to cause the processor to:

receive an application programming interface (API) call request to map one or more portions of hierarchical reference data comprised in a digital twin system that digitally represents one or more assets within an industrial environment;

in response to the API call request, generate one or more flattened asset data objects associated with the one or more portions of the hierarchical reference data, wherein the one or more flattened asset data objects comprise respective mappings of one or more data attributes for the one or more portions of the hierarchical reference data;

correlate one or more portions of raw streaming data related to the one or more assets with at least one flattened asset data object of the one or more flattened asset data objects to generate contextualized asset data for the one or more assets; and update, based on the contextualized asset data, the digital twin system to facilitate one or more asset data queries for the one or more assets via the digital twin system.

* * * * *